US011423182B2

(12) United States Patent
Jung et al.

(10) Patent No.: US 11,423,182 B2
(45) Date of Patent: Aug. 23, 2022

(54) STORAGE DEVICE PROVIDING FUNCTION OF SECURELY DISCARDING DATA AND OPERATING METHOD THEREOF

(71) Applicant: Samsung Electronics Co., Ltd., Suwon-si (KR)

(72) Inventors: Brian Myungjune Jung, Suwon-si (KR); Daeok Kim, Yongin-si (KR); Moonwook Oh, Seoul (KR); Hyunsook Hong, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/213,756

(22) Filed: Mar. 26, 2021

(65) Prior Publication Data
US 2021/0334416 A1    Oct. 28, 2021

(30) Foreign Application Priority Data
Apr. 28, 2020    (KR) .......................... 10-2020-0051831

(51) Int. Cl.
*G06F 21/79*    (2013.01)
*G06F 3/06*    (2006.01)
*G06F 21/78*    (2013.01)

(52) U.S. Cl.
CPC ............ *G06F 21/79* (2013.01); *G06F 3/0652* (2013.01); *G06F 21/78* (2013.01); *G06F 2221/2143* (2013.01)

(58) Field of Classification Search
CPC ........ G06F 21/79; G06F 21/78; G06F 3/0652; G06F 2221/2143

(Continued)

(56) References Cited

U.S. PATENT DOCUMENTS 7,679,133 B2    3/2010    Son et al.
8,275,996 B1 *  9/2012    Melvin ................... G06F 21/85
                                                              713/189

(Continued)

FOREIGN PATENT DOCUMENTS

JP    2005018415 A  *  1/2005    ............. G06F 21/80
JP    2006-252021 A     9/2006

(Continued)

OTHER PUBLICATIONS

Forgor et al., "Security of Data on E-waste equipment to Africa: The Case of Ghana", IEEE, doi: 10.1109/ICCSPN46366.2019.9150166, 2019, pp. 1-5. (Year: 2019).*

(Continued)

*Primary Examiner* — Peter C Shaw
(74) *Attorney, Agent, or Firm* — Harness, Dickey & Pierce, P.L.C.

(57) ABSTRACT

A storage device providing a function of securely discarding data and an operating method of the storage device are provided. The storage device includes a safety pin device removably mounted on the storage device, the safety pin device configured to store first encrypted information and second encrypted information, the first encrypted information encrypted using a first key associated with a first user, and the second encrypted information encrypted using a second key associated with a second user, security circuitry configured to, receive the first encrypted information from the safety pin device, decrypt the first encrypted information, and generate a data encryption key based on results of the decrypting the first encrypted information, and a non-volatile memory configured to store data encrypted with the data encryption key.

18 Claims, 16 Drawing Sheets

(58) Field of Classification Search
USPC ........................................................ 713/191
See application file for complete search history.

(56) References Cited

U.S. PATENT DOCUMENTS

| | | | |
|---|---|---|---|
| 8,553,466 | B2 | 10/2013 | Han et al. |
| 8,559,235 | B2 | 10/2013 | Yoon et al. |
| 8,654,587 | B2 | 2/2014 | Yoon et al. |
| 8,832,402 | B2 | 9/2014 | Goss et al. |
| 9,177,488 | B2 | 11/2015 | Chontos et al. |
| 9,467,288 | B2 | 10/2016 | Obukhov et al. |
| 2010/0185843 | A1 | 7/2010 | Olarig et al. |
| 2011/0233648 | A1 | 9/2011 | Seol et al. |
| 2016/0370204 | A1* | 12/2016 | Spanier .................... H04Q 9/00 |

FOREIGN PATENT DOCUMENTS

| | | | | |
|---|---|---|---|---|
| JP | 2012-090231 | A | 5/2012 | |
| JP | 2018191070 | A * | 11/2018 | ............. G06F 3/122 |
| KR | 20050032324 | A * | 10/2003 | ........... H04L 9/0822 |
| KR | 20080093331 | A * | 4/2007 | ........... H04L 9/0869 |
| KR | 20090035968 | A * | 10/2007 | ........... H04L 9/3234 |
| KR | 101661731 | B1 | 9/2016 | |
| TW | 222304 | B1 * | 10/2004 | |

OTHER PUBLICATIONS

Huang et al., "A Study on Information Security Management with Personal Data Protection", IEEE, doi: 10.1109/ICPADS.2011.16, 2011, pp. 624-630. (Year: 2011).*

Fernando et al., "Secure decommissioning of confidential electronically stored information (CESI): A framework for managing CESI in the disposal phase as needed", IEEE, World Congress on Internet Security (WorldCIS—2012), 2012, pp. 218-222. (Year: 2012).*

Chhabra et al., "i-NVMM: A secure non-volatile main memory system with incremental encryption", IEEE, doi: 10.1145/2000064.2000086, 2011, pp. 177-188. (Year: 2011).*

* cited by examiner

STORAGE DEVICE PROVIDING FUNCTION OF SECURELY DISCARDING DATA AND OPERATING METHOD THEREOF

CROSS-REFERENCE TO RELATED APPLICATION

This application claims the benefit of priority to Korean Patent Application No. 10-2020-0051831, filed on Apr. 28, 2020, in the Korean Intellectual Property Office (KIPO), the disclosure of which is incorporated herein in its entirety by reference.

BACKGROUND

Various example embodiments of the inventive concepts relate to a storage device, and more particularly, to a storage device providing a function of securely discarding data, a system including the storage device, and/or an operating method thereof.

A storage system may include a host and a storage device. A data server managing a plurality of storage devices may be an example of a storage system, and may encrypt data of users and store the encrypted data on the storage system, or may decrypt encrypted data and provide the decrypted data to a user.

When a user wants to erase or discard data stored in a data server, data erasing or discarding is usually performed by discarding an encryption key used for data encryption and/or decryption. However, a user may not check whether the user's data is normally discarded, and therefore, a data server has difficulties in providing users with services having an optimal security function and/or verifiable security function.

SUMMARY

Various example embodiments of the inventive concepts provide a storage device including a function of securely discarding a user's data and allowing the user to directly check and/or directly determine whether the data or a storage device has been normally discarded, a system including the storage device, an operating method of the storage device, and/or a non-transitory computer readable medium including computer readable instructions for performing the operating method of the storage device.

According to at least one example embodiment of the inventive concepts, there is provided a storage device including a safety pin device removably mounted on the storage device, the safety pin device configured to store first encrypted information and second encrypted information, the first encrypted information encrypted using a first key associated with a first user, and the second encrypted information encrypted using a second key associated with a second user, security circuitry configured to, receive the first encrypted information from the safety pin device, decrypt the first encrypted information, and generate a data encryption key based on results of the decrypting the first encrypted information, and a nonvolatile memory configured to store data encrypted with the data encryption key.

According to at least one example embodiment of the inventive concepts, there is provided a safety pin device including at least one storage circuit configured to store first encrypted information and second encrypted information, the first encrypted information encrypted using a first key, and the second encrypted information encrypted using a second key, and a first interface circuit configured to output the second encrypted information to allow the second user to determine whether the storage device has been properly discarded after the safety pin device is removed from the storage device.

According to at least one example embodiment of the inventive concepts, there is provided an operating method of a storage device including providing first encrypted information stored in the safety pin device to the security circuitry through communication between the safety pin device and the security circuitry, decrypting, by the security circuitry, the first encrypted information using a first key stored in the security circuitry, generating, by the security circuitry, a data encryption key based on first information, the first information extracted from the first encrypted information, encrypting data using the data encryption key, and storing the encrypted data.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Hereinafter, various example embodiments will be described in detail with reference to the accompanying drawings.

Figure 1:
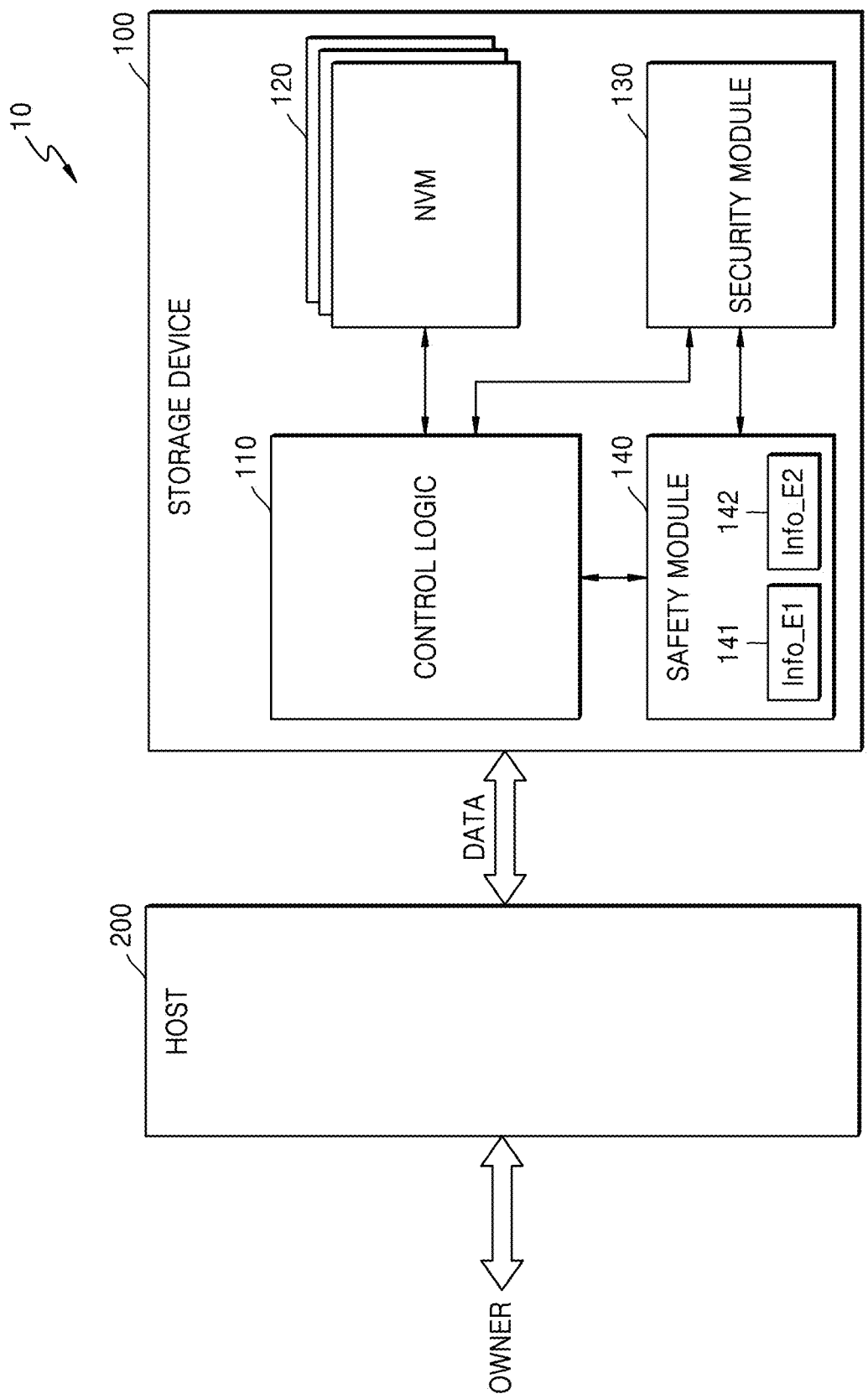
FIG. 1 is a block diagram of a storage system according to at least one example embodiment.

FIG. 1 is a block diagram of a storage system according to at least one example embodiment.

Referring to FIG. 1, a storage system 10 may include a storage device 100 and/or a host 200, etc., but the example embodiments are not limited thereto. The storage device 100 may include a control logic 110 (e.g., control logic circuitry, etc.) and a non-volatile memory (NVM) 120 (e.g., NVM device(s), etc.), etc. The host 200 may communicate with the storage device 100 through various interfaces and, when there is a user's or a data owner's request to store data in the storage system 10 and/or to read data from the storage system 10, the host 200 may control the storage device 100 to store and/or read the data according to the user's request.

For example, when the storage system 10 is a data server (or a data center, a cloud server, a network server, a network attached storage (NAS) system, etc.) and a server (e.g., an application server) controlling data storage is separate from a server (e.g., a storage server) including a storage medium, the host 200 may be included in the application server, however the example embodiments are not limited thereto, and the host 200 and/or the storage system 10 may be any capable computing device and the storage device 10 may be any capable storage system, e.g., a personal computer (PC), a laptop, a smartphone, etc., and a storage device connected to and/or accessible to the PC, laptop, smartphone, etc. According to various example embodiments, when the storage device 100 is applied to a mobile device, the host 200 may include an application processor (AP) and/or a system-on-chip (SoC), etc., but the example embodiments are not limited thereto.

The storage device 100 may include one or more storage media for storing data under the control of the host 200. For example, the storage device 100 may include at least one solid state drive (SSD), at least one hard disk, combinations of non-heterogeneous storage media (e.g., storage media of different types, such as a SSD and a hard disk), etc. When the storage device 100 includes an SSD, the NVM 120 may include a plurality of flash memories (e.g., NAND chips, etc.) storing data in a non-volatile manner. In some example embodiments, the storage device 100 may include a universal flash storage (UFS) memory card, compact flash (CF) memory, secure digital (SD) memory, micro-SD memory, mini-SD memory, extreme digital (xD) memory, a memory stick, or the like. According to some example embodiments, the storage device 100 may include a mass storage device such as a hard disk drive (HDD), etc.

When the storage device 100 includes flash memory, the flash memory may include a two-dimensional (2D) NAND memory array and/or a three-dimensional (3D) or vertical NAND (VNAND) memory array. The 3D memory array may be monolithically formed at at least one physical level of arrays of memory cells, which have an active region on a silicon substrate, or a circuit, which is involved in the operation of the memory cells and formed on or in the substrate. The term "monolithic" means that layers of each level of an array are directly stacked on layers of an underlying level of the array.

In at least one example embodiment, the 3D memory array includes vertical NAND strings which are arranged in a vertical direction so that at least one memory cell is placed on another memory cell. The memory cell may include a charge trap layer.

Structures of a 3D memory array, in which the 3D memory array includes a plurality of levels and word lines and/or bit lines are shared by levels, are disclosed in U.S. Pat. Nos. 7,679,133, 8,553,466, 8,654,587, 8,559,235, and U.S. Patent Application No. 2011/0233648, the disclosures of which are incorporated herein by references.

According to some example embodiments, the storage device 100 may include other types of memory. For example, the storage device 100 may include various types of non-volatile memory, such as magnetic random access memory (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), nano floating gate memory (NFGM), holographic memory, molecular electronics memory, and/or insulator resistance change memory, etc.

The control logic 110 may write data to the NVM 120 and/or read data from the NVM 120 under the control of the host 200. In at least one example embodiment, the storage device 100 may include a buffer circuit, which temporarily stores write data and/or read data, although not shown in FIG. 1. The buffer circuit may include volatile memory such as dynamic RAM (DRAM), etc.

The storage system 10 may encrypt a user's data and/or store encrypted data in the storage device 100, and/or decrypt the encrypted data and/or provide decrypted data to the user, etc., at the user's request. For example, the storage system 10 may be included in a data server, which stores multiple users' data, and the host 200 may perform a control operation to store a user's data in the storage device 100, but the example embodiments are not limited thereto. Although only one storage device 100 is illustrated in FIG. 1 for the convenience of description, a plurality of storage devices may be included in the storage system 10, etc.

According to at least one example embodiment, the storage device 100 may further include processing circuitry, and the processing circuitry may include security circuitry (e.g., a security module) 130 and/or safety circuitry (e.g., a safety module) 140, etc., but is not limited thereto. According to some example embodiments, the processing circuitry is capable of performing the functionality of one or more of the security circuitry 130, the safety circuitry 140, and/or the control logic circuitry 110, etc. The processing circuitry may include hardware, such as processors, processor cores, logic circuits, storage devices, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), s System-on-Chip (SoC), etc. In other example embodiments, the security circuitry 130, the safety circuitry 140, and/or the control logic circuitry 110 may be combined into a single circuit, or one or more separate circuits/components/elements, etc.

According to at least one example embodiment, the security circuitry 130 may be mounted on the storage device 100 as a separate chip and/or may be included in the control logic 110 of the storage device 100. The security circuitry 130 may perform various kinds of security processes such as data encryption and/or decryption in the storage device 100, but is not limited thereto. For example, the security circuitry 130 may include at least one encryption/decryption key (hereinafter, referred to as a data encryption key) and may encrypt data in response to a write request of the host 200 and decrypt encrypted data read from the NVM 120 in response to a read request of the host 200 using the data encryption key(s).

The safety circuitry 140 may be included in the storage device 100 and may provide a function of securely discarding, deleting, removing, etc., a user's data. When the storage system 10 corresponds to a data server storing a user's data, the user may want the user's data to be securely erased from the storage system 10, etc. For example, the user may want data stored on a storage device and/or the actual storage device storing the user's data to be actually discarded (e.g., surely discarded and/or verifiably discarded, etc.). In addition, the user may want to directly check and/or determine whether a storage device that is actually discarded is the one that the user wants to discard.

According to at least one example embodiment, the safety circuitry 140 provides a function allowing a user to check whether data or a storage device that the user wanted to discard has been properly discarded. In addition, the safety circuitry 140 provides a function allowing a data server and/or a server administrator running the data server to check and/or determine whether a storage device that a user wanted to discard has been properly discarded. For example, the safety circuitry 140 may be removably mounted on the storage device 100 and may store information used by a user and/or a server in a discard check procedure (e.g., information related to and/or corresponding to the discard check procedure, etc.). After the safety circuitry 140 is removed from the storage device 100, information stored in the safety circuitry 140 may be provided to a user and/or a device (e.g., a safety pin tester (SPT)) circuitry of a server), etc.

According to at least one example embodiment, the safety circuitry 140 may include a storage circuit which stores information in a non-volatile manner, and first encrypted information Info_E1 and/or second encrypted information Info_E2, etc., may be stored in the storage circuit, but is not limited thereto. For example, although a first storage circuit 141 storing the first encrypted information Info_E1 is separate from a second storage circuit 142 storing the second encrypted information Info_E2 in FIG. 1, the first encrypted information Info_E1 and the second encrypted information Info_E2 may be stored in a single storage circuit, there may be greater than two storage circuits and/or greater than two pieces of encrypted information, etc.

The first encrypted information Info_E1 is information encrypted using a unique key (e.g., unique encryption key, etc.), hereinafter, referred to as a manufacturer key, which is managed by a company (e.g., a data server, etc.) running the storage system 10 or a company which manufactures the storage system 10. The data server may check and/or determine whether the storage device 100, from which the safety circuitry 140 has been removed, is the storage device 100 that a user has actually requested to discard, based on information generated by decrypting the first encrypted information Info_E1, but the example embodiments are not limited thereto. The second encrypted information Info_E2 is information encrypted using a unique key (e.g., unique encryption key, etc.), hereinafter, referred to as an owner key, which is managed by a data owner requesting to store data, but the example embodiments are not limited thereto. A user may check whether the storage device 100, from which the safety circuitry 140 has been removed, is the storage device that the user has actually requested to discard, based on information generated by decrypting the second encrypted information Info_E2.

According to at least one example embodiment, the safety circuitry 140 may be removed from the storage device 100 which a user wants to discard, and a data server and/or the user may check and/or determine whether an actually discarded storage device is the storage device which the user has requested to discard based on the first encrypted information Info_E1 and the second encrypted information Info_E2 stored in the safety circuitry 140.

According at least one example embodiment, at least one of the first encrypted information Info_E1 and the second encrypted information Info_E2 (e.g., a selected one of the encrypted information Info_E1 or the Info_E2) may be used to generate a data encryption key, which is used in a data encryption and/or decryption operation of the storage device 100. In at least one example embodiment, the security circuitry 130 may include key derivation circuitry (not shown) configured to derive a data encryption key, and may generate the data encryption key based on information extracted from the at least one encrypted information selected between the first encrypted information Info_E1 and the second encrypted information Info_E2, but the example embodiments are not limited thereto. Accordingly, when the storage device 100 is discarded by removing the safety circuitry 140 at a user's request, encrypted data stored in the storage device 100 may not be decrypted, and therefore, the user's data may be securely discarded.

According to at least one example embodiment, a user may definitely check and/or determine (e.g., verify, etc.) whether a discarded storage device (e.g., a storage device which has been discarded, removed, deleted, wiped, securely formatted, etc.) is the one that the user really wanted to discard, compared to the case of discarding data just by erasing a data encryption key. For example, there may be a case where a data encryption key may be wrongly erased from a different storage device than the storage device a user actually wanted to discard (e.g., desired to discard, intended to discard, etc.) in the storage system 10 including a plurality of storage devices 100. However, according to at least one example embodiment, each of a data server and/or a user may perform a discard check procedure based on information of the safety circuitry 140 removed from the storage device 100, and therefore, the user may directly check and/or determine whether a target storage device has been definitely and/or actually discarded. Consequently, security for the user may be enhanced. In addition, according to at least one example embodiment, because the storage device 100 is discarded by physically removing the safety circuitry 140, there may be no possibility of a data encryption key unintentionally remaining in the storage device 100. Moreover, because information desired and/or necessary to derive the data encryption key is removed from the storage device 100, data stored in the storage device 100 may be securely discarded.

Because the safety circuitry 140 may be removably mounted on the storage device 100, the safety circuitry 140 may be referred to as a safety pin or a safety pin device, etc. When the security circuitry 130 is implemented as a separate semiconductor chip, the security circuitry 130 may be referred to as a security chip or a security chip device, etc.

Although it has been described that the storage system 10 corresponds to a data server, the example embodiments are not limited thereto. The storage device 100 according to at least one example embodiment may be used variously. For example, storage system 10 may correspond to a personal computer (PC), network-attached storage (NAS), a smart device, an Internet of things (IoT) device, an Internet of Everything (IoE) device, a wearable device, a gaming console, a virtual reality (VR) device, an augmented reality (AR) device, an autonomous device, a vehicle, and/or a portable electronic device, etc.

Hereinafter, various implementable example embodiments will be described. In the descriptions of the example embodiments, the term "user" stated above corresponds to an owner of data and thus may be used along with the term "data owner," etc., and a key generated and managed by a user may be referred to as an owner key. In addition, a manufacturer of a storage device may be the same as or different from a company (e.g., a data server) running the storage system 10 of FIG. 1, etc. It is assumed in the example embodiments described below that a data server is provided with a plurality of storage devices from a manufacturer and runs a server, but the example embodiments are not limited thereto.

According to at least one example embodiment, an encryption/decryption key managed by a data server and/or an administrator of the data server (e.g., a first user) may be referred to as a manufacturer key, and the data server may be provided with a manufacturer key with respect to each of a plurality of storage devices, but the example embodiments are not limited thereto. Each of the storage devices may include, for example, a serial number corresponding to the storage device as unique information and/or use other unique identifier for the storage device, etc., and the data server may also be provided with the serial numbers (e.g., unique identifier) of the respective storage devices and may manage the serial numbers (e.g., unique identifier). However, example embodiments are not limited thereto, and at least some of the operations of a storage system or a data server may be configured to be performed by a manufacturer of a storage device in some example embodiments. According to at least one example embodiment, "discarding of data" may interchangeably be used with "discarding of a storage device", but the example embodiments are not limited thereto. For example, with respect to data in a storage device may no longer be usable when a safety pin is removed from the storage device, it may be stated that the data is discarded. In addition, because the storage device having a safety pin removed therefrom is not reuseable or usable, it may be stated that the storage device is discarded.

Figure 2:
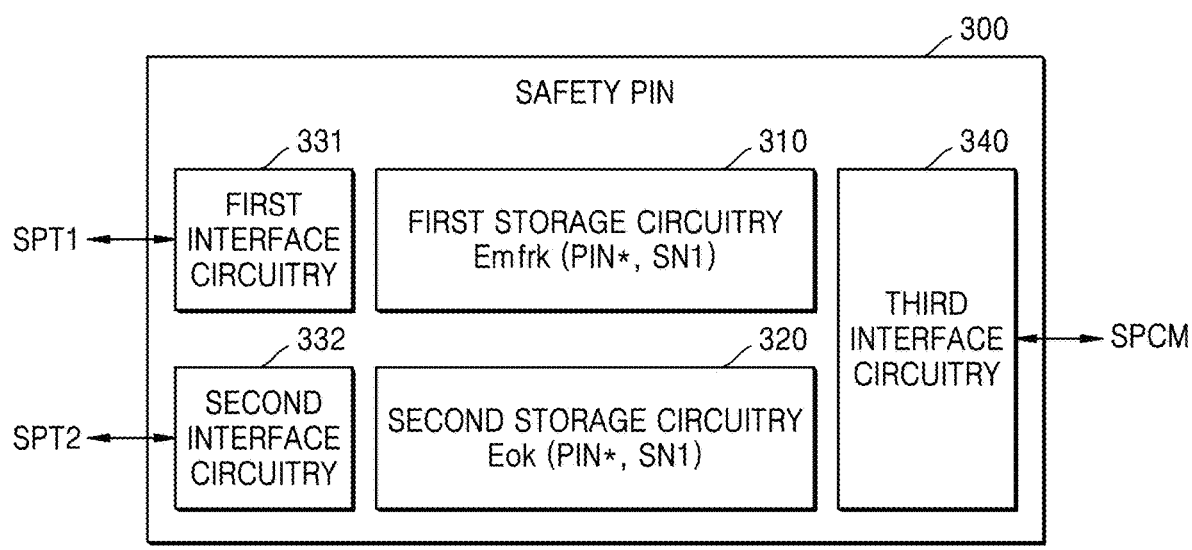
FIG. 2 is a block diagram of an example implementation of safety circuitry in FIG. 1 according to at least one example embodiment.

FIG. 2 is a block diagram of an example implementation of the safety circuitry in FIG. 1. In at least one example embodiment below, a safety circuitry may be referred to as a safety pin.

Referring to FIG. 2, a safety pin 300 may include a first storage circuit 310 and/or a second storage circuit 320, but is not limited thereto, and may include a greater or lesser number of storage circuits and/or other constituent elements. The first storage circuit 310 may store first encrypted information Emfrk(Pin*, SN1), and the second storage circuit 320 may store second encrypted information Eok(Pin*, SN1), etc. According to at least one example embodiment, the safety pin 300 may be mounted on a storage device (not shown) after the first encrypted information Emfrk(Pin*, SN1) and the second encrypted information Eok(Pin*, SN1) are set in the safety pin 300. Additionally, the first encrypted information Emfrk(Pin*, SN1) and the second encrypted information Eok(Pin*, SN1) may be set in the safety pin 300 that has been mounted on the storage device, etc.

The first encrypted information Emfrk(Pin*, SN1) may correspond to information encrypted using a manufacturer key mfrk. For example, the first encrypted information Emfrk(Pin*, SN1) may be obtained by encrypting a personal identification number PIN* and a serial number SN1 (and/or unique identifier) of a storage device using the manufacturer key mfrk. A personal identification number (PIN) is unique information set by and/or assigned to a data owner and may include various kinds of information, such as a password set by the data owner, personal information, and the like. When a data owner (e.g., a second user, etc.) provides a personal identification number to a data server, the personal identification number may be protected through, for example, encryption performed by the user and/or the data server. The personal identification number PIN* in FIG. 2 may be defined as encrypted information of the personal identification number. However, the example embodiments are not limited thereto, and for example, the plaintext of a personal identification number may be directly encrypted.

The second encrypted information Eok(Pin*, SN1) may correspond to information (e.g., data, etc.) encrypted using an owner key ok. A user may (e.g., data owner, etc.) generate and provide the second encrypted information Eok(Pin*, SN1) to a data server. A data owner may perform encryption using the owner key ok through a user terminal based on various methods. For example, the second encrypted information Eok(Pin*, SN1) may be generated by performing a digital signature on the personal identification number PIN* and the serial number SN1 using a private key in a public key infrastructure (PKI) such as Rivest-Shamir-Adleman (RSA), however the example embodiments are not limited thereto. Besides the above, the data owner may generate the second encrypted information Eok(Pin*, SN1) using various methods. For example, various kinds of encryption algorithms such as a Diffie-Hellman (DH) key agreement may be used, etc.

To generate the first encrypted information Emfrk(Pin*, SN1) and the second encrypted information Eok(Pin*, SN1), various kinds of information may be exchanged between a data owner and at least one data server, etc. For example, the personal identification number PIN* of the data owner may be provided to the data server through a user terminal in wired and/or wireless communication network, or information related to the personal identification number PIN* may be provided to the data server off-line (e.g., not transmitted over a network and instead directly input to the data server, provided using a connected storage device, etc.) to enhance security. The data server may also provide the data owner with the serial number SN1 for a digital signature, but the example embodiments are not limited thereto.

The safety pin 300 may further include a first interface circuit 331, a second interface circuit 332, and/or a third interface circuit 340, etc., but the example embodiments are not limited thereto. When the safety pin 300 is removed from the storage device, the first interface circuit 331 may communicate with at least one device of a data server (e.g., a server SPT SPT1 device), which may access the safety pin 300, and the first encrypted information Emfrk(Pin*, SN1) may be provided to the server SPT SPT1 through the first interface circuit 331. The server SPT SPT1 may decrypt the first encrypted information Emfrk(Pin*, SN1) using the manufacturer key (e.g., a first key). Whether the storage device from which the safety pin 300 has been removed is the storage device that is really requested and/or intended to be discarded may be checked and/or verified using information extracted and/or decrypted from the first encrypted information Emfrk(Pin*, SN1).

The second interface circuit 332 may communicate with at least one device of a user (e.g., a user SPT SPT2), which may access the safety pin 300, and the second encrypted information Eok(Pin*, SN1) may be provided to the user SPT SPT2 through the second interface circuit 332. The user SPT SPT2 may decrypt the second encrypted information Eok(Pin*, SN1) using the owner key (e.g., second key). Whether the storage device from which the safety pin 300 has been removed is the one that is really requested and/or intended to be discarded may be checked and/or verified by the user using information extracted and/or decrypted from the second encrypted information Eok(Pin*, SN1).

The third interface circuit 340 may perform communication to set the safety pin 300. For example, the third interface circuit 340 may communicate with at least one external device (e.g., a safety pin creation module (SPCM) and/or safety pin creation circuitry, etc.), which controls an operation of setting the safety pin 300. The SPCM may provide the first encrypted information Emfrk(Pin*, SN1) and the second encrypted information Eok(Pin*, SN1), to the safety pin 300 through the third interface circuit 340, but the example embodiments are not limited thereto. At least one method for generating the first encrypted information Emfrk (Pin*, SN1) and the second encrypted information Eok (Pin*, SN1) using the SPCM will be described below.

Although the first through third interface circuits 331, 332, and 340 are separate elements in FIG. 2, the example embodiments are not limited thereto. For example, at least part of communication with the server SPT SPT1, the user SPT SPT2, and the SPCM may be performed through one interface circuit, etc.

Figure 3:
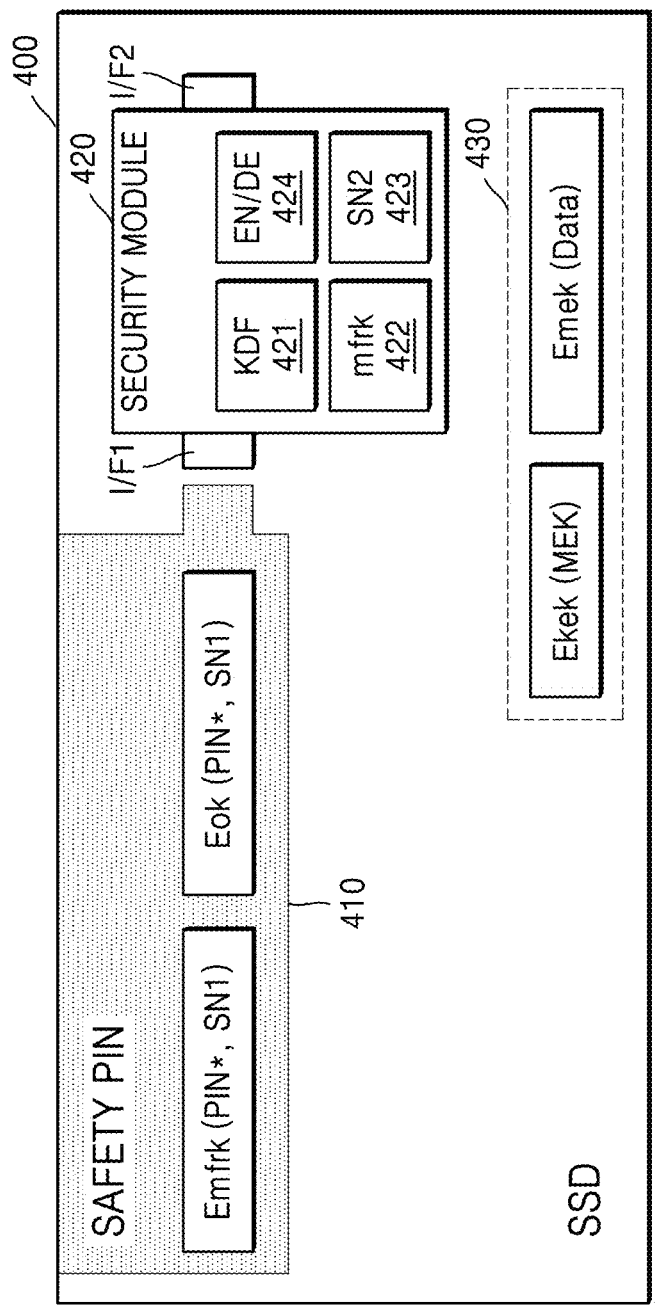
FIG. 3 is a block diagram of an example implementation of a storage device having a safety pin mounted thereon according to at least one example embodiment.

FIG. 3 is a block diagram of an example implementation of a storage device having a safety pin mounted thereon according to at least one example embodiment.

Referring to FIG. 3, a storage device 400 may include a safety pin 410 (e.g., safety circuitry, safety module, etc.), a security circuitry 420 (e.g., security module 420), and/or an NVM 430, etc., but the example embodiments are not limited thereto. As the safety pin 410 is mounted on the storage device 400, at least one terminal of the safety pin 410 may be connected to the security circuitry 420 such that the safety pin 410 may communicate with the security circuitry 420. According to at least one example embodiment, the safety pin 410 may include the first encrypted information Emfrk(Pin*, SN1) and the second encrypted information Eok(Pin*, SN1), but the example embodiments are not limited thereto. The security circuitry 420 may include various kinds of information and elements. For example, the security circuitry 420 may include key derivation circuitry 421 (e.g., a key derivation module 421), a first storage circuit 422 storing the manufacturer key mfrk, and/or a second storage circuit 423 storing a serial number SN2 of the storage device 400, etc., but the example embodiments are not limited thereto. Although the serial number SN1 included in the encrypted information and the serial number SN2 stored in the second storage circuit 423 are denoted by different reference characters, the serial numbers SN1 and SN2 may have the same value indicating the storage device 400.

The key derivation circuitry 421 may perform a key derivation function KDF and may perform an operation based on information stored in the security circuitry 420 to generate a data encryption key MEK used to encrypt and/or decrypt a user's data. For example, the key derivation circuitry 421 may derive a first key kek based on a desired and/or certain function operation, such as a hash operation, on an input, and the first key kek may correspond to a key encryption key used to encrypt the data encryption key MEK, but is not limited thereto.

In an example operation, the key derivation circuitry 421 may derive the first key kek using, as an input, at least one selected from the personal identification number PIN* and the serial number SN1. In an example operation, the security circuitry 420 may receive the first encrypted information Emfrk(Pin*, SN1) from the safety pin 410 and extract the personal identification number PIN* and the serial number SN1 by decrypting the first encrypted information Emfrk (Pin*, SN1) using the manufacturer key mfrk stored therein, and the key derivation circuitry 421 may derive the first key kek using at least one selected from the personal identification number PIN* and the serial number SN1 as an input, but the example embodiments are not limited thereto.

The security circuitry 420 may perform authentication on the safety pin 410 mounted on the storage device 400 using the serial number SN1 extracted from the first encrypted information Emfrk(Pin*, SN1). For example, the security circuitry 420 may perform the authentication based on results of determining whether the serial number SN2 stored in the security circuitry 420 is identical to the serial number SN1 that has been extracted, and a series of operations of generating the data encryption key MEK may be performed only when the authentication is successful (e.g., the results of the determining indicate the serial number SN2 is identical to the serial number SN1, etc.).

Third encrypted information Ekek(MEK) obtained by encrypting the data encryption key MEK used to encrypt and/or decrypt a user's data may be stored in the NVM 430, but the example embodiments are not limited thereto. Encrypted user's data Emek(Data) may also be stored in the NVM 430. Although the third encrypted information Ekek (MEK) is stored in the NVM 430 in the at least one example embodiment of FIG. 3, the example embodiments are limited thereto. For example, the third encrypted information Ekek(MEK) may be stored in a storage circuit (not shown) separately provided outside the NVM 430, etc.

According to at least one example embodiment, when the first key kek is derived, the third encrypted information Ekek(MEK) may be decrypted using the first key kek, and accordingly, the data encryption key MEK may be extracted. Because the storage device 400 encrypts and/or decrypts the user's data using the data encryption key MEK, data may be encrypted and/or decrypted only when the safety pin 410 is authenticated by the storage device 400 as a normal device, and accordingly, the security of the storage device 400 may be improved and/or enhanced.

The security circuitry 420 may further include encryption/decryption circuitry (EN/DE) 424 (e.g., an encryption/decryption module 424), which may perform encryption and/or decryption operations desired and/or required in the storage device 400. For example, the encryption/decryption circuitry (EN/DE) 424 may perform decryption to generate the data encryption key MEK and may encrypt and/or decrypt a user's data using the data encryption key MEK.

According to at least one example embodiment, the functions of the key derivation circuitry 421 and the encryption/decryption circuitry 424 may be implemented in various forms within the security circuitry 420. For example, each of the key derivation circuitry 421 and the encryption/decryption circuitry 424 may be processing circuitry and implemented by hardware and/or by software through the execution of computer readable instructions. Additionally, each of the key derivation circuitry 421 and the encryption/decryption circuitry 424 may be implemented by as separate circuits and/or modules, etc.

The security circuitry 420 may include a first interface I/F1 and/or a second interface I/F2, etc., but is not limited thereto. The first interface I/F1 may communicate with the safety pin 410. The second interface I/F2 may communicate with at least one device external to and/or outside the storage device 400. For example, the security circuitry 420 may communicate with an external SPCM through the second interface I/F2 to provide information of the storage device 400 needed to set the safety pin 410, but the example embodiments are not limited thereto.

Figure 4:
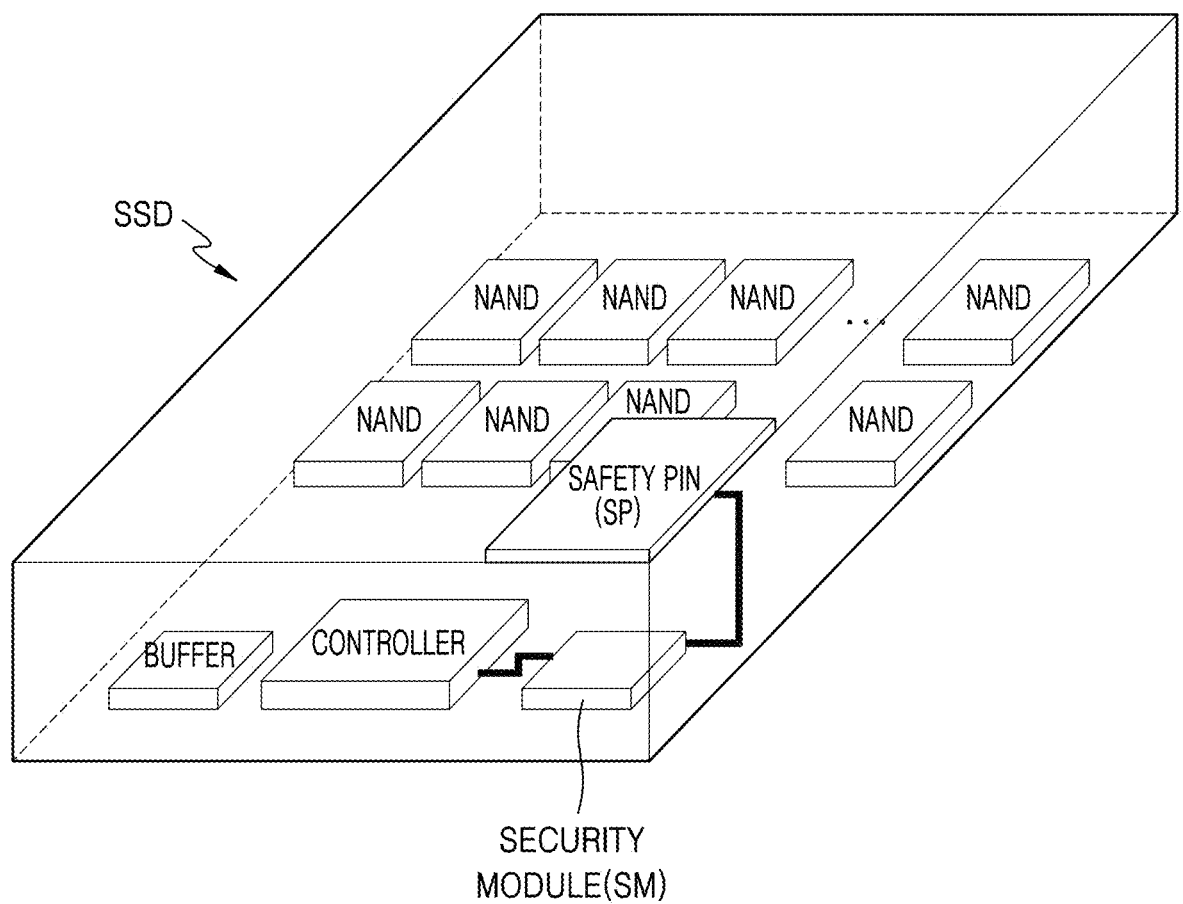
FIG. 4 is a perspective view of an example implementation of the storage device of FIG. 3 according to at least one example embodiment.

FIG. 4 is a perspective view of an example implementation of the storage device 400 of FIG. 3 according to at least one example embodiment.

As an example of a storage device, an SSD may include a safety pin SP mounted on the outer surface of a main body, which may include a plurality of NAND chips, security circuitry SM, a controller (or a control logic, control logic circuitry, processing circuitry, etc.), and/or a buffer, etc., as shown in FIG. 4, but the example embodiments are not limited thereto, and the example embodiments may include a greater or lesser number of constituent elements. Because the safety pin SP is mounted on the outer surface of the main body of the SSD, the safety pin SP may be mounted on the SSD after a setting operation on the safety pin SP is completed, and may be easily removed from the SSD to discard the SSD, etc.

According to at least one example embodiment, the safety pin SP may be connected to the security circuitry SM through a physical wiring in the SSD, and the security circuitry SM may communicate with the controller. Although not specifically shown in FIG. 4, the controller may be connected to the buffer and the NAND chips and may exchange data with an external host, but is not limited thereto. According to at least one example embodiment, data may be normally stored in or read from the SSD after the security circuitry SM normally receives, from the safety pin SP, information (e.g., the first encrypted information, etc.) for generating a data encryption key. After the safety pin SP is removed from the SSD, the data encryption key does not remain in the SSD, and accordingly, data stored in the SSD may be securely discarded and/or may not be accessed by unauthorized users, etc.

Figure 5:
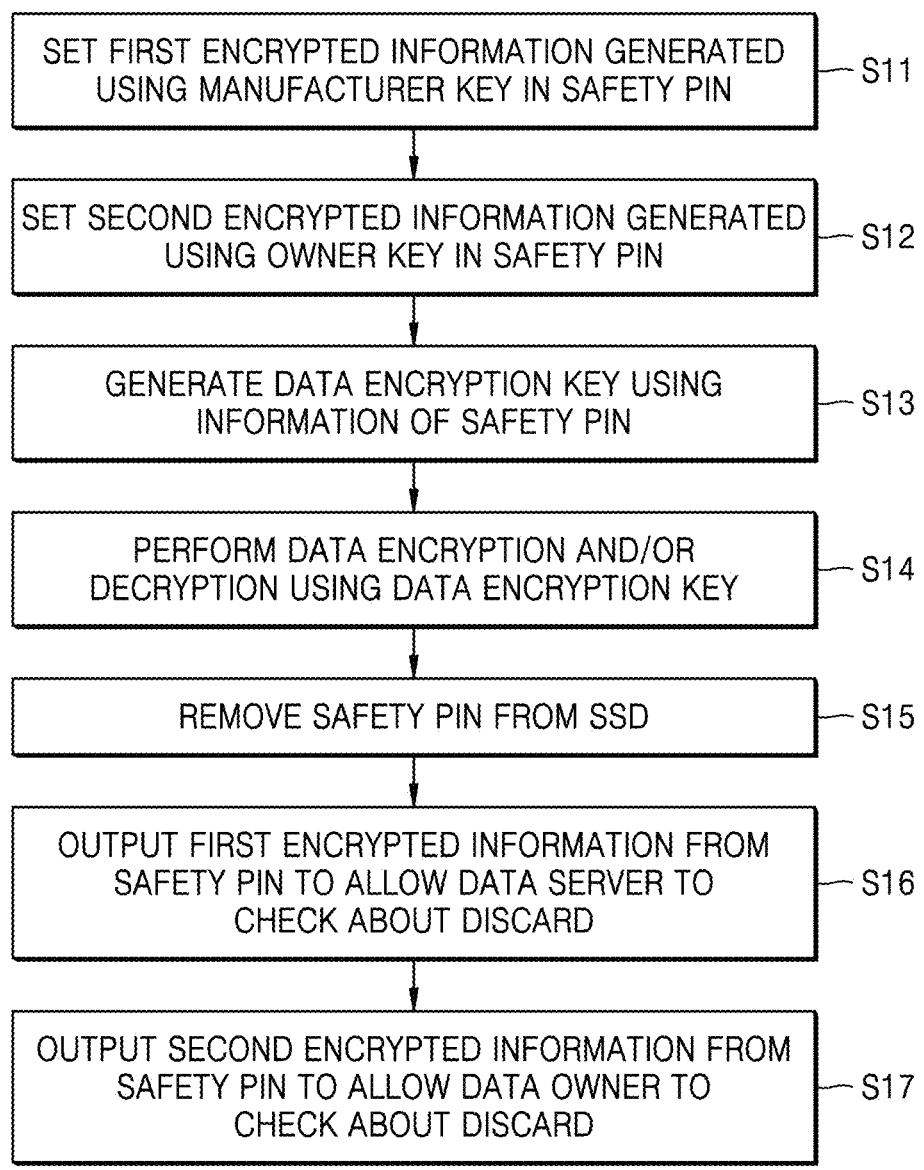
FIG. 5 is a flowchart of an operating method of a storage system, according to at least one example embodiment.

FIG. 5 is a flowchart of an operating method of a storage system, according to at least one example embodiment. In the description of the operating method of FIG. 5, it is assumed that the storage system represents one of a plurality of storage devices included in a data server, a server administrator may purchase the storage devices from a manufacturer to run a server, and a safety pin is set by a data server or a server administrator, according to at least one example embodiment. It is also assumed in the at least one example embodiment below that the storage device corresponds to an SSD, but the example embodiments are not limited thereto.

To securely discard an SSD at the request of a data owner and/or to support a function allowing a user to check about discarding, a data server or a server administrator may create a safety pin corresponding to the SSD according to at least one example embodiment, and may mount (e.g., connect, install, etc.) the safety pin to the SSD. For example, at least one SSD may be allocated to the data owner (e.g., second user) for data storage through a contract with the data server or through the request of the data owner, and various kinds of information may be exchanged between the data server and/or an administrator of the data server (e.g., a first user) and the data owner off-line and/or through wired/wireless communication during the creation of the safety pin, etc.

A data server may be provided with a plurality of SSDs to be used in a data server from a manufacturer of the SSDs and may also be provided with manufacturer keys and serial numbers and/or other forms of unique identifiers of the respective SSDs. For example, the data server may be provided with a manufacturer key set in common for a plurality of SSDs or manufacturer keys individually set for the respective SSDs, but the example embodiments are not limited thereto. The data server may provide the serial numbers to the data owner or may be provided with a personal identification number from the data owner (and/or a unique identifier associated with the data owner, etc.), but the example embodiments are not limited thereto.

A data server may generate first encrypted information using the manufacturer key and may set the first encrypted information in a safety pin in operation S11. The data server may generate the first encrypted information by encrypting a serial number of a desired and/or certain SSD (hereinafter, referred to as a first SSD), which is allocated to a data owner, and personal identification information, which is requested and provided from the data owner, using the manufacturer key, and may set the first encrypted information in the safety pin, but the example embodiments are not limited thereto.

Additionally, the data server may request second encrypted information generated using an owner key from the data owner and may provide the serial number of the first SSD to the data owner. The data owner may generate the second encrypted information by encrypting the serial number of the first SSD, which is provided from the data server, and the personal identification information, which is provided to the data server, using the owner key and may provide the second encrypted information to the data server, and the data server may set the second encrypted information in the safety pin in operation S12, but the example embodiments are not limited thereto.

Thereafter, the data server may mount the safety pin with the setting completed on the first SSD, and the first SSD may communicate with the safety pin and generate a data encryption key using information stored in the safety pin in operation S13, but the example embodiments are not limited thereto. According to at least one example embodiment, the data encryption key used for data encryption and/or decryption may be encrypted using a desired and/or certain key (e.g., a key encryption key) and then stored in the first SSD, and security circuitry of the first SSD may have, as an input, information extracted and/or decrypted from the first encrypted information and used to derive the key encryption key. After the key encryption key is derived, the data encryption key may be extracted and/or generated through decryption using the key encryption key, and the first SSD may encrypt and/or decrypt a user's data using the data encryption key in operation S14. According to at least one example embodiment, the data encryption key used for data encryption and/or decryption may be generated based on information stored in the safety pin, and accordingly, the user's data may be encrypted and/or decrypted only when the normally authenticated safety pin is mounted on the first SSD. Consequently, data security may be enhanced and/or improved.

When there is the data owner's request to discard the first SSD, the safety pin may be removed from the first SSD by a server administrator, etc., in operation S15. The data server may perform a procedure for checking, determining, and/or verifying whether the discarded first SSD is the SSD that the data owner has actually requested to discard and/or desired to be discarded using the safety pin removed from the first SSD, and the safety pin may output the first encrypted information to a device (e.g., a server SPT) of the data server in operation S16. According to at least one example embodiment, because the data server has determined the manufacturer key, the server SPT may decrypt the first encrypted information using the manufacturer key and check information (e.g., at least one selected from a personal identification number and a serial number, etc.) extracted through the decryption, thereby checking, determining, and/or verifying whether the SSD requested and/or desired by the data owner to be discarded has been properly discarded.

According to at least one example embodiment, the data owner may perform a discard check procedure, and the safety pin may output the second encrypted information to a device (e.g., a user SPT, etc.) of the data owner in operation S17. According to at least one example embodiment, because the data owner knows and/or has possession of the owner key, the user SPT may decrypt the second encrypted information using the owner key and check, determine, and/or verify information (e.g., at least one selected from a personal identification number and a serial number) extracted through the decryption so that the data owner may check, determine, and/or verify whether the SSD has been properly discarded. For example, the data owner may have stored the serial number provided from the data server and/or stored the personal identification number set by the data owner, and may check whether the SSD requested to be discarded has been properly discarded based on the extracted information and the information held by the data owner.

Figure 6:
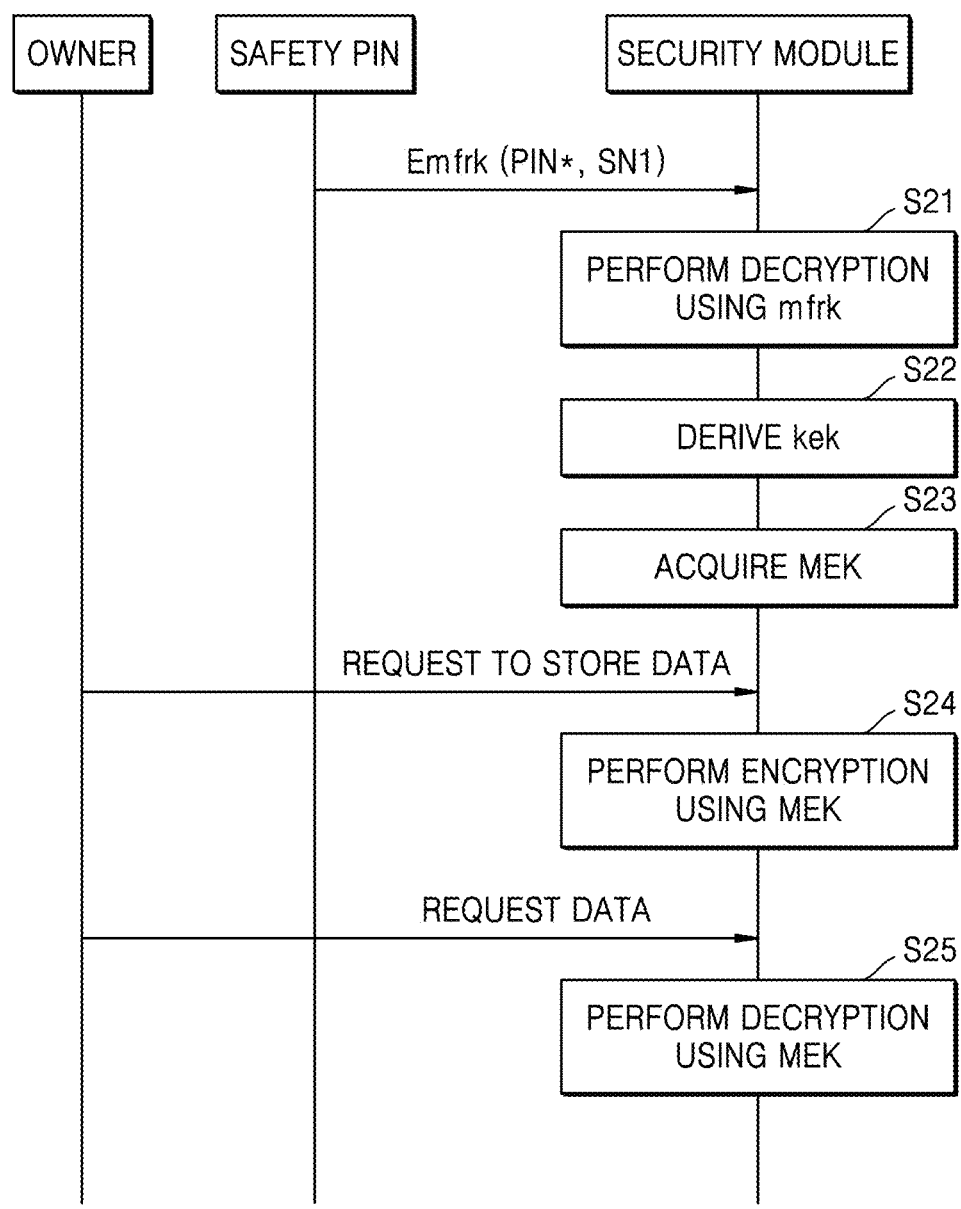
FIG. 6 is a flowchart of data store and read operations of a solid state drive (SSD) having a safety pin mounted thereon, according to at least one example embodiment.

FIG. 6 is a flowchart of data store and read operations of an SSD having a safety pin mounted thereon, according to at least one example embodiment.

Referring to FIG. 6, the safety pin may communicate with a security circuitry of the SSD. In the initial driving of the SSD, the first encrypted information Emfrk(Pin*, SN1) stored in the safety pin may be provided to the security circuitry, and the security circuitry of the SSD may decrypt the first encrypted information Emfrk(Pin*, SN1) using the manufacturer key mfrk stored therein in operation S21, but the example embodiments are not limited thereto. According to at least one example embodiment, the security circuitry may include key derivation circuitry. The key derivation circuitry may be processing circuitry include hardware and/or a combination of hardware executing software for executing at least one key derivation function, but the example embodiments are not limited thereto, and for example, the key derivation circuitry may be included in the security circuitry, etc.

The personal identification number PIN* and/or the serial number SN1 extracted from the first encrypted information Emfrk(Pin*, SN1) may be provided as an input of the key derivation circuitry, and the key encryption key kek may be derived through the key derivation function in operation S22. For example, the key derivation circuitry may use both the personal identification number PIN* and the serial number SN1 as inputs. The data encryption key MEK used for real data encryption and/or decryption may be encrypted using the key encryption key kek and then stored in the SSD, and the security circuitry may acquire the data encryption key MEK by performing decryption using the key encryption key kek, which has been derived before, in operation S23.

Thereafter, a data owner may provide data to a data server and transmit a request to store data. The data server may encrypt the data using the data encryption key MEK and store encrypted data in an NVM in operation S24. The data owner may request data from the data server. The data server may decrypt the data using the data encryption key MEK in operation S25 and may provide decrypted data to the data owner.

Figure 7:
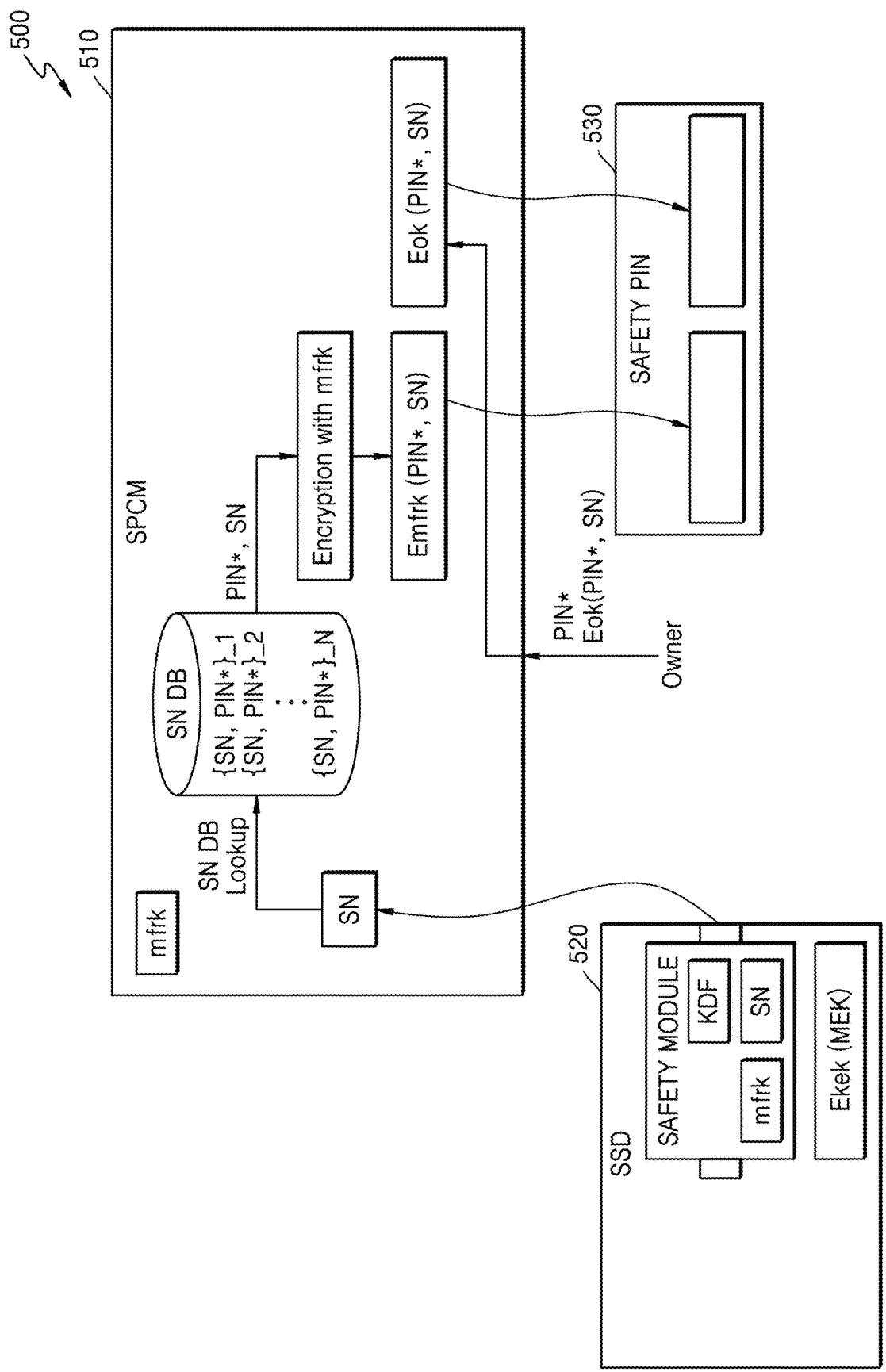
FIGS. 7 and 8 are diagrams of an operation of setting a safety pin, according to some example embodiments.
Figure 8:
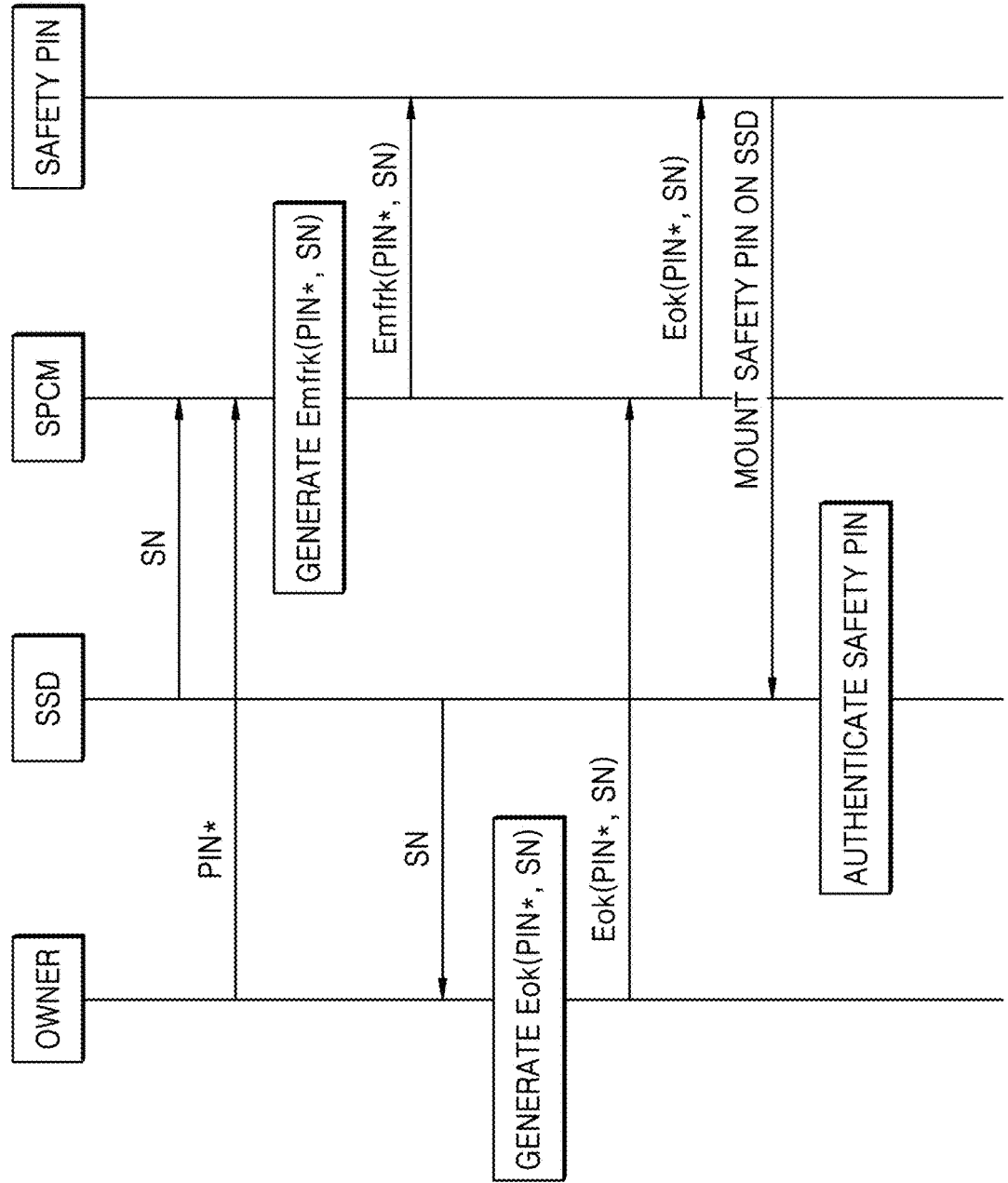

FIGS. 7 and 8 are diagrams of an operation of setting a safety pin, according to some example embodiments.

Referring to FIG. 7, a data server 500 may perform server functions based on various devices. For example, the data server 500 may include an SSD 520, a safety pin 530, and/or an SPCM 510, for performing a setting operation on the safety pin 530, etc., but the example embodiments are not limited thereto. The SPCM 510 may include an interface circuit (not shown) to communicate with the SSD 520 and the safety pin 530, etc. Although the SPCM 510 performs a setting operation on the safety pin 530 in a state where the safety pin 530 is separate from the SSD 520 in FIG. 7, the SPCM 510 may perform the setting operation on the safety pin 530 in a state where the safety pin 530 has been mounted on the SSD 520, etc.

The SPCM 510 may include a serial number database SN DB, which stores serial numbers of a plurality of SSDs included in and/or connected to the data server 500. The personal identification number PIN* provided from each of data owners using the SSDs may also be stored in the serial number database SN DB. It is illustrated in FIG. 7 that N pairs of serial numbers SN and personal identification numbers PIN*, e.g., {SN, PIN*}_1 through {SN, PIN*}_N, are stored in the serial number database SN DB, but the example embodiments are not limited thereto. According to at least one example embodiment, a serial number SN may be provided from security circuitry of the SSD 520, on which the safety pin 530 will be mounted, to the SPCM 510, etc. A personal identification number PIN* matching the serial number SN may be determined. With respect to each SSD, the serial number SN and the personal identification number PIN* matching the serial number SN may be encrypted using the manufacturer key mfrk.

An example of a safety pin setting operation of the data server 500 of FIG. 7 will be described with reference to FIG. 8 below.

Referring to FIGS. 7 and 8, the SPCM 510 may be provided with the serial number SN from an SSD and the personal identification number PIN* from a data owner, and may manage a plurality of serial numbers SN and personal identification numbers PIN* stored in at least one database. When a desired and/or particular SSD (e.g., the SSD 520 in FIG. 7, etc.) is connected to the SPCM 510, the serial number SN of the SSD 520 may be provided to the SPCM 510, and the SPCM 510 may generate first encrypted information Emfrk(Pin*, SN) by encrypting the serial number SN and the personal identification number PIN* matching the personal identification number PIN* with the manufacturer key mfrk, and may set and/or store the first encrypted information Emfrk(Pin*, SN) in the safety pin 530, but the example embodiments are not limited thereto.

The data server 500 may provide the serial number SN to a data owner, and request the data owner generate second encrypted information Eok(Pin*, SN). The data owner may possess and/or know the personal identification number PIN* that the data owner has set, and generate the second encrypted information Eok(Pin*, SN) by encrypting the serial number SN and the personal identification number PIN* using the owner key ok. The second encrypted information Eok(Pin*, SN) generated by the data owner may be provided to the SPCM 510. The SPCM 510 may set, input, and/or store the second encrypted information Eok(Pin*, SN) in the safety pin 530.

When the setting of the safety pin 530 is completed, the safety pin 530 may be mounted on the SSD 520. In an example operation, the safety pin 530 may be mounted on the SSD 520 based on a plug-in method, but the example embodiments are not limited thereto. Accordingly, when power is applied to the SSD 520 having the safety pin 530 mounted thereon, communication may be performed between the safety pin 530 and security circuitry (not shown) of the SSD 520, the safety pin 530 may be authenticated, and a series of operations may be performed according to an authentication result to generate a data encryption key used for data encryption and/or decryption, etc.

Figure 9:
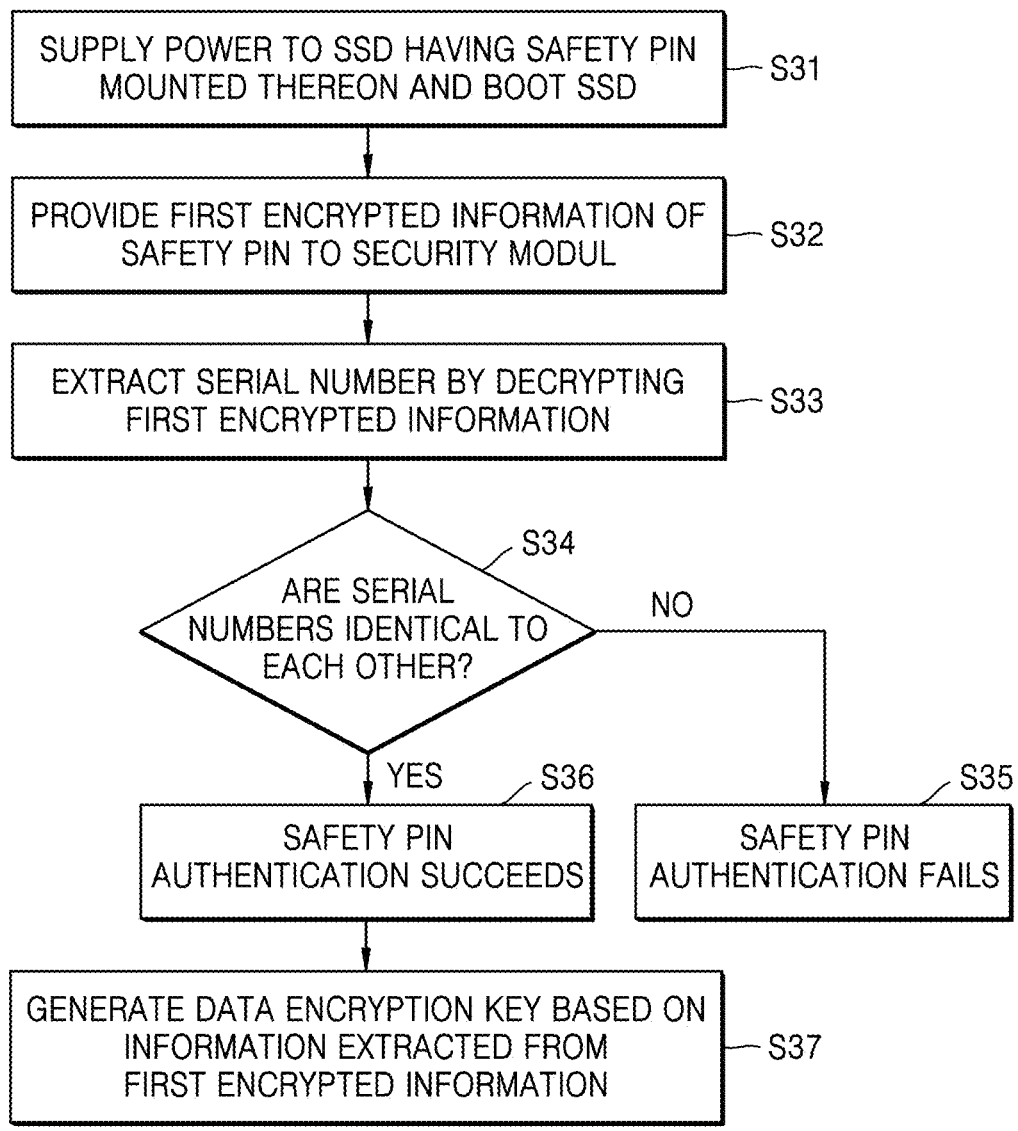
FIG. 9 is a flowchart of operations of a storage device, according to at least one example embodiment.

FIG. 9 is a flowchart of operations of a storage device, according to at least one example embodiment. FIG. 9 illustrates an example of authentication of a safety pin in the initial driving of an SSD having the safety pin mounted thereon.

Referring to FIG. 9, the safety pin generated according to at least one example embodiment may be mounted on an SSD, and the SSD may perform a booting operation (e.g., boot-up operation, power on operation, etc.) when power is supplied to the SSD in operation S31. During the booting operation, first encrypted information stored in the safety pin may be provided to security circuitry in operation S32. Since the first encrypted information has been generated by encryption using a manufacturer key, the security circuitry may decrypt the first encrypted information using the manufacturer key stored therein. Accordingly, the security circuitry of the SSD may extract a serial number included in the first encrypted information by decrypting the first encrypted information, etc.

Authentication of the safety pin may be performed based on results of determining whether the serial number extracted from the first encrypted information is identical to a serial number stored in the safety pin. For example, when the serial numbers are not identical to each other, the SSD (e.g., the processing circuitry of the SSD, such as the security circuitry, etc.) determines that the authentication of the safety pin fails in operation S35, and accordingly, a procedure for generating a data encryption key for data encryption and/or decryption may not be performed. Contrarily, when the serial numbers are identical to each other, the SSD (e.g., the processing circuitry of the SSD, such as the security circuitry, etc.) determines that the authentication of the safety pin succeeds in operation S36, and accordingly, a procedure for generating the data encryption key may be performed based on information (e.g., the serial number and a personal identification number) extracted from the first encrypted information in operation S37.

In at least one example embodiment, a serial number including a random digit string (and/or a pseudo-random digit string, etc.), a unique identifier, etc., is used as information for authentication, but example embodiments are not limited thereto. For example, additional information such as a checksum may be further used for the authentication such that whether a serial number has been forged may be checked, and accordingly, the accuracy of the authentication may be enhanced.

According to at least one example embodiment, because the authentication may be successful in the SSD on which the safety pin is normally mounted and a user's data may be encrypted and/or decrypted based on the successful authentication, the user's data stored in the SSD may be securely discarded when the safety pin is removed from the SSD. In addition, the authentication operations may be performed during each booting of the SSD, and the data encryption key temporarily stored in the security circuitry may be removed and/or discarded when the data storing and providing is completed. In other words, after the safety pin is removed from the SSD, the data encryption key is not in the SSD and is difficult and/or impossible to be generated, and therefore, the user's data may be securely discarded.

Figure 10:
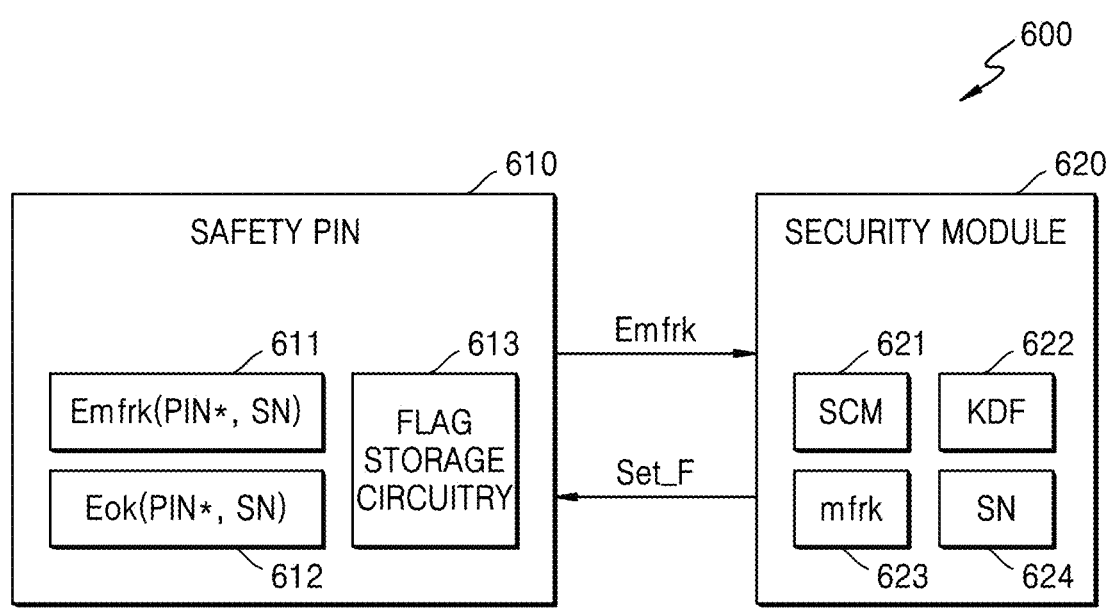
FIGS. 10 and 11 are diagrams of a storage device and an operating method thereof, according to some example embodiments.
Figure 11:
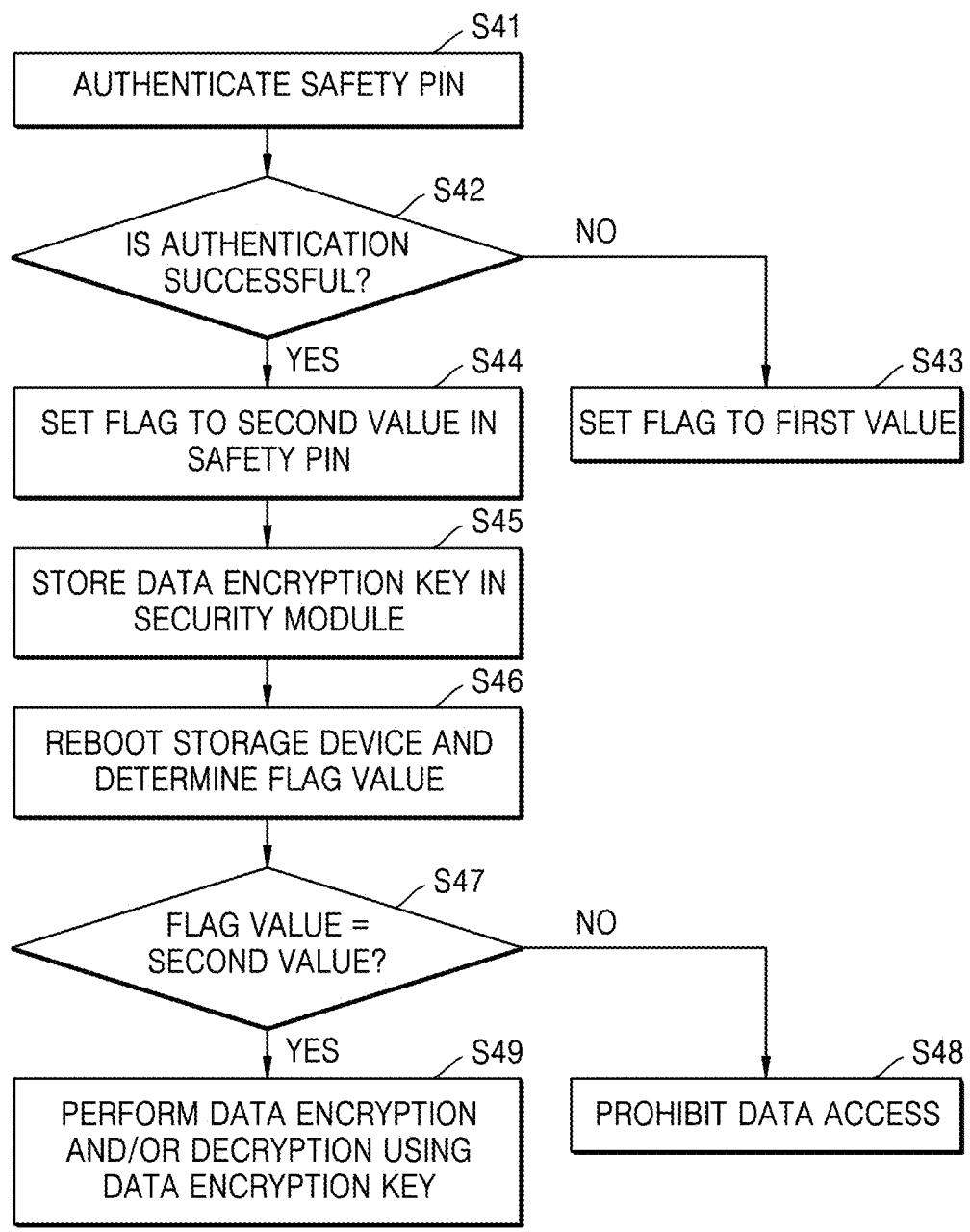

FIGS. 10 and 11 are diagrams of a storage device and an operating method thereof, according to some example embodiments.

Referring to FIG. 10, a storage device 600 may include a safety pin 610 and/or a security circuitry 620, but is not limited thereto. The safety pin 610 may store the first encrypted information Emfrk(Pin*, SN) and the second encrypted information Eok(Pin*, SN), and may include a flag storage circuit 613, etc. The security circuitry 620 may include safety pin authentication circuitry 621 (e.g., a safety pin authentication module 621) and key derivation circuitry 622 and may store a manufacturer key 623 (e.g., the manufacturer key mfrk) and a serial number 624 (e.g., the serial number SN), but the example embodiments are not limited thereto.

The safety pin authentication circuitry 621 may authenticate the safety pin 610 according to at least one example embodiment. For example, the safety pin authentication circuitry 621 may perform authentication based on a comparison between the serial number SN extracted from the first encrypted information Emfrk(Pin*, SN) and the serial number 624 stored in the security circuitry 620. The security circuitry 620 may perform a setting operation on the flag storage circuit 613 according to an authentication result. For example, the security circuitry 620 may set a flag Set_F having a first value in the flag storage circuit 613 when the authentication fails and may set a flag Set_F having a second value in the flag storage circuit 613 when the authentication succeeds.

An example of the operation of the storage device 600 of FIG. 10 will be described with reference to FIG. 11 below according to at least one example embodiment.

Referring to FIGS. 10 and 11, the security circuitry 620 may authenticate the safety pin 610 in operation S41, may determine whether the authentication succeeds or fails in operation S42, may set the flag having the first value in the flag storage circuit 613 in response to the authentication failing in operation S43, and therefore may not perform a procedure for generating a data encryption key. Otherwise, in response to the authentication succeeds, the security circuitry 620 may set the flag having the second value in the flag storage circuit 613 of the safety pin 610 in operation S44.

When the authentication of the safety pin 610 succeeds, the data encryption key may be generated and stored in the security circuitry 620 in operation S45. Thereafter, when the storage device 600 is rebooted, communication may be performed between the safety pin 610 and the security circuitry 620, and the security circuitry 620 may determine the flag stored in the flag storage circuit 613 of the safety pin 610 without performing the authentication of operation S46.

Whether the flag has the second value indicating that the authentication has succeeded may be determined in operation S47. When the flag does not have the second value, a data access using the data encryption key may be prohibited and/or disabled in operation S48. Otherwise, when the flag has the second value, data encryption and/or decryption may be performed using the data encryption key, which has been generated and stored in the security circuitry 620 through the authentication operations, in operation S49.

According to at least one example embodiment, the storage device 600 does not need and/or is not required to authenticate the safety pin 610 during each booting operation, and may perform data encryption and/or decryption based on a result of authenticating the safety pin 610 during an initial booting operation. For example, when the mounted state of the safety pin 610 is successfully authenticated in the initial booting operation and the configuration of the storage device 600 is maintained (e.g., the safety pin 610 is not removed from the storage device 600 and/or the storage device 600 is not modified, etc.), a normal data access may be performed using the data encryption key stored in the security circuitry 620, without newly performing an authentication of the safety pin 610, based on a result of checking the flag set in the safety pin 610. Contrarily, when the initial authentication of the safety pin 610 fails, if a flag value indicating the authentication failure is set, the storage device 600 is not operated normally (e.g., data access to the encrypted user data is prohibited and/or disabled) even when the storage device 600 is rebooted, until a successful authentication of the safety pin 610 is performed, so that a user's data may not be accessed and/or may be prevented from being used without permission.

Even when the authentication of the safety pin 610 succeeds in the initial booting operation, a flag value set in the safety pin 610 may not be identified after the safety pin 610 is removed from the storage device 600, and therefore, a user's data may be more difficult to be used without permission and/or prevented from being used without permission. When the flag value set in the safety pin 610 cannot be identified after the data encryption key is stored in the security circuitry 620, an operation of removing the data encryption key may be further performed under the control of the security circuitry 620 so that the data encryption key may be deleted, removed, and/or does not remain in the storage device 600 after the safety pin 610 is removed from the storage device 600.

Figure 12:
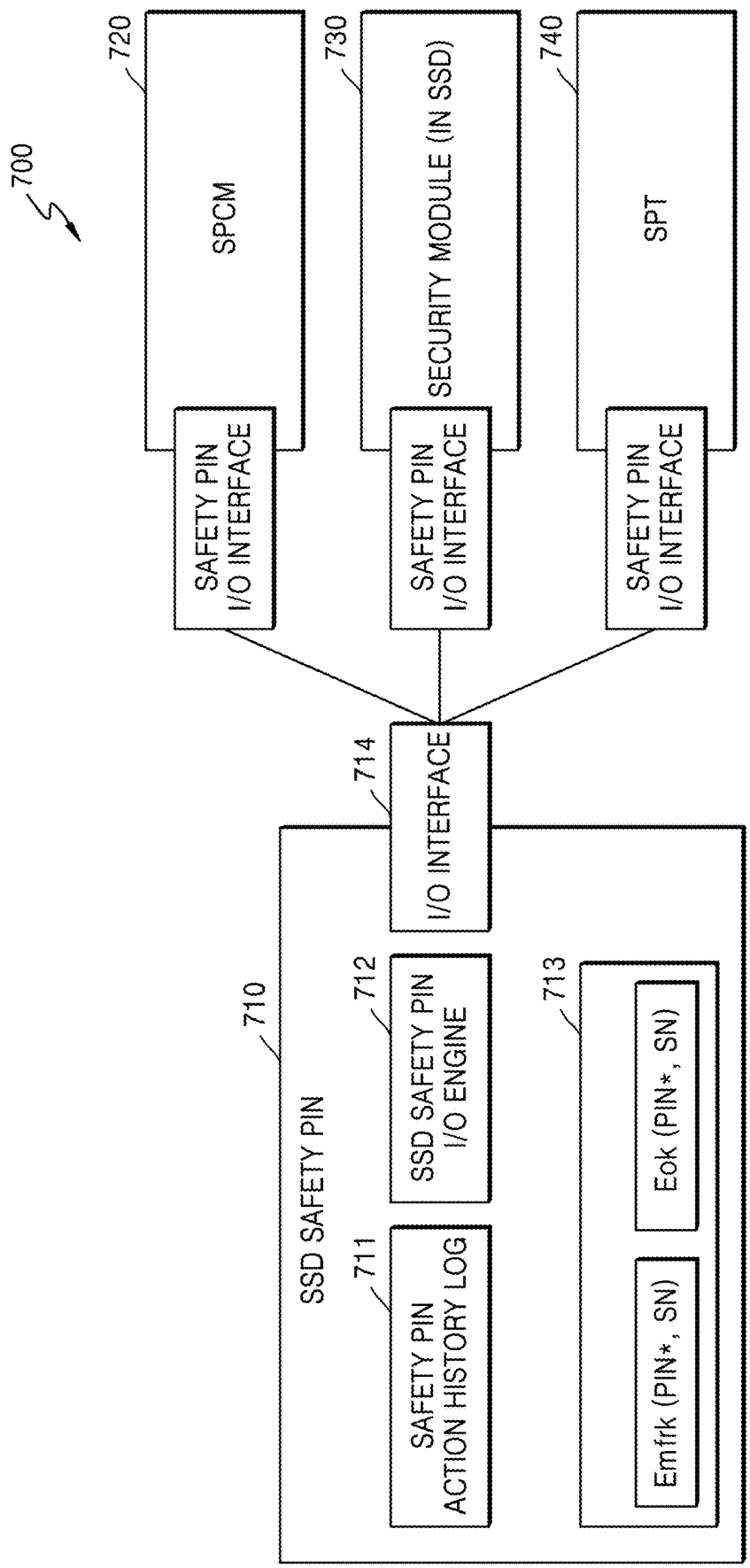
FIGS. 12 and 13 are diagrams of various operations of a storage system, according to at least one example embodiment.
Figure 13:
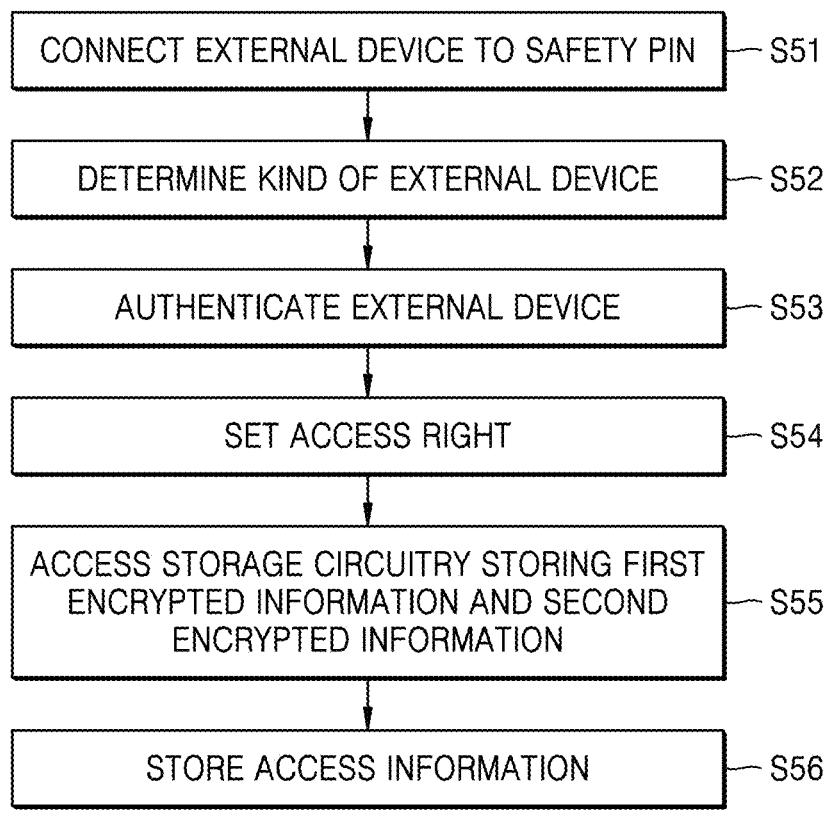

FIGS. 12 and 13 are diagrams of various operations of a storage system, according to at least one example embodiment. FIG. 12 shows various devices that communicate with the safety pin (e.g., an SSD safety pin).

Referring to FIG. 12, a storage system 700 may include an SSD safety pin 710, and various devices communicating with the SSD safety pin 710 are illustrated. For example, the SSD safety pin 710 may communicate with an SPCM 720 setting encrypted information, a security circuitry 730 included in a storage device (not shown), and/or an SPT 740 checking whether the storage device has been normally discarded, but the example embodiments are not limited thereto. According to some example embodiments, the SPT 740 may include an SPT used by an administrator of the storage device for a discard check and/or an SPT used by a data owner for a discard check. It is assumed that the SPT 740 in FIG. 12 corresponds to the SPT used by a data owner for a discard check, but the example embodiments are not limited thereto.

The SSD safety pin 710 may include various elements, for example, a safety pin action history log 711, an SSD safety pin input/output (I/O) engine 712, a storage circuit 713, and/or an I/O interface circuit 714, etc., but is not limited thereto. The I/O interface circuit 714 of the SSD safety pin 710 may provide a common interface communicating with the various devices. The storage circuit 713 may store the first encrypted information Emfrk(Pin*, SN) and the second encrypted information Eok(Pin*, SN).

The SSD safety pin I/O engine 712 may determine the kind and/or type of device connected to the SSD safety pin 710 based on information transmitted and received through the I/O interface circuit 714, and may set an access right to the storage circuit 713 based on a determination result. In an example operation, the I/O interface circuit 714 may receive information identifying a device and/or unique information of a device from the device, which is outside (e.g., external to) and connected to the SSD safety pin 710, and the SSD safety pin I/O engine 712 may determine the kind of the device based on the received information. The SSD safety pin I/O engine 712 may be implemented as processing circuitry, e.g., by a hardware circuit such as an application-specific integrated circuit (ASIC), and/or a combination of hardware and software using, e.g., a micro controller unit (MCU), etc., and/or other various forms, and for example, may be integrated with the processing circuitry of the SSD, the security circuitry 730, etc.

For example, when the SPCM 720 is connected to the SSD safety pin 710, the SSD safety pin I/O engine 712 may determine the connection of the SPCM 720 based on information received through the I/O interface circuit 714 and may set an access right such that the first encrypted information Emfrk(Pin*, SN) and the second encrypted information Eok(Pin*, SN) from the SPCM 720 are stored in the storage circuit 713. When the security circuitry 730 is connected to the SSD safety pin 710, the SSD safety pin I/O engine 712 may set the access right to the storage circuit 713 such that the first encrypted information Emfrk(Pin*, SN) is read and provided to the security circuitry 730. When the SPT 740 of the data owner is connected to the SSD safety pin 710, the SSD safety pin I/O engine 712 may set the access right to the storage circuit 713 such that the second encrypted information Eok(Pin*, SN) is read and provided to the SPT 740.

To enhance the security of the SSD safety pin 710 or the storage device having the SSD safety pin 710 mounted thereon, the safety pin action history log 711 may store the history of accesses to the storage circuit 713, but the example embodiments are not limited thereto. In an example operation, an access to the storage circuit 713 may be controlled by the SSD safety pin I/O engine 712, and the SSD safety pin I/O engine 712 may store the access history in the safety pin action history log 711, etc. For example, when the first encrypted information Emfrk(Pin*, SN) and the second encrypted information Eok(Pin*, SN) are stored by the SPCM 720 in the storage circuit 713, information indicating that the SPCM 720 has accessed the storage circuit 713, a time stamp indicating an access time, and the like, may be stored in the safety pin action history log 711 under the control of the SSD safety pin I/O engine 712, but the example embodiments are not limited thereto.

An example operation of the storage system 700 of FIG. 12 will be described with reference to FIG. 13 below according to at least one example embodiment.

Any one of various external devices such as the SPCM 720, the security circuitry 730, and the SPT 740, etc., may be connected to the SSD safety pin 710 in operation S51. The SSD safety pin 710 may determine the kind and/or type of external device connected thereto in operation S52. Authentication may be performed between the SSD safety pin 710 and the external device. For example, the SSD safety pin 710 and the external device may mutually perform authentication by exchanging and processing various kinds of information in operation S53. Various methods may be used for the authentication. For example, challenge-response authentication may be performed, but the example embodiments are not limited thereto.

When the authentication succeeds, the SSD safety pin 710 may set an access right of the external device to a storage circuit, which stores key information in the SSD safety pin 710, in operation S54. For example, an access right to the storage circuit may be differently set according to the types and/or kinds of external devices connected to the SSD safety pin 710. A right to store or read the first encrypted information Emfrk(Pin*, SN) and the second encrypted information Eok(Pin*, SN) in or from the storage circuit may be differently set. According to at least one example embodiment, the storage circuit storing the first encrypted information Emfrk(Pin*, SN) and the second encrypted information Eok(Pin*, SN) may be accessed according to the set right in operation S55, and information indicating an access history may be stored in the SSD safety pin 710 in operation S56, but the example embodiments are not limited thereto.

Figure 14:
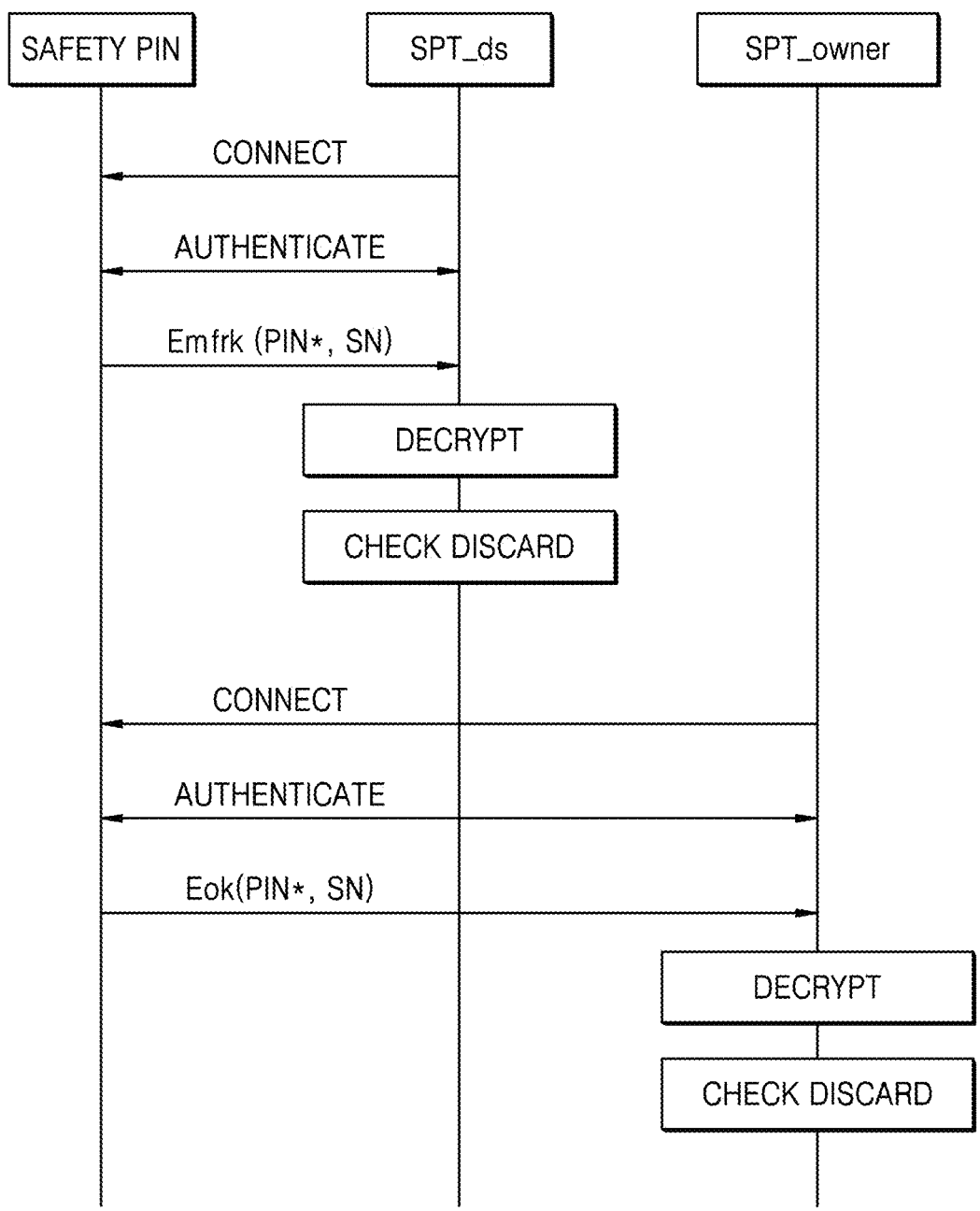
FIG. 14 is a flowchart of a procedure for checking whether a storage device has been discarded, according to at least one example embodiment.

FIG. 14 is a flowchart of a procedure for checking whether a storage device has been discarded, according to at least one example embodiment.

Referring to FIG. 14, when a safety pin is connected to a data server SPT SPT_ds (e.g., a storage device and/or interface of the data server SPT, etc.), the safety pin may mutually perform authentication with the data server SPT SPT_ds and may determine that the connected device is the data server SPT SPT_ds. The safety pin may set an access right such that the first encrypted information Emfrk(Pin*, SN) is read from a storage circuit, and accordingly, the first encrypted information Emfrk(Pin*, SN) may be provided to the data server SPT SPT_ds. The data server SPT SPT_ds may decrypt the first encrypted information Emfrk(Pin*, SN) using the manufacturer key mfrk and may perform a discard check procedure according to at least one example embodiment. According to at least one example embodiment, a data server may manage serial numbers and/or personal identification numbers in at least one database. For a storage device determined as being discarded through the discard check procedure, a mark and/or information indicating the discarding of the storage device may be stored in the database, but the example embodiments are not limited thereto.

Similarly, when the safety pin is connected to a data owner SPT SPT_owner, the safety pin may mutually perform authentication with the data owner SPT SPT_owner and may provide the second encrypted information Eok (Pin*, SN) to the data owner SPT SPT_owner according to an authentication result. The data owner SPT SPT_owner may decrypt the second encrypted information Eok(Pin*, SN), and may perform a discard check procedure according to at least one example embodiment.

Figure 15:
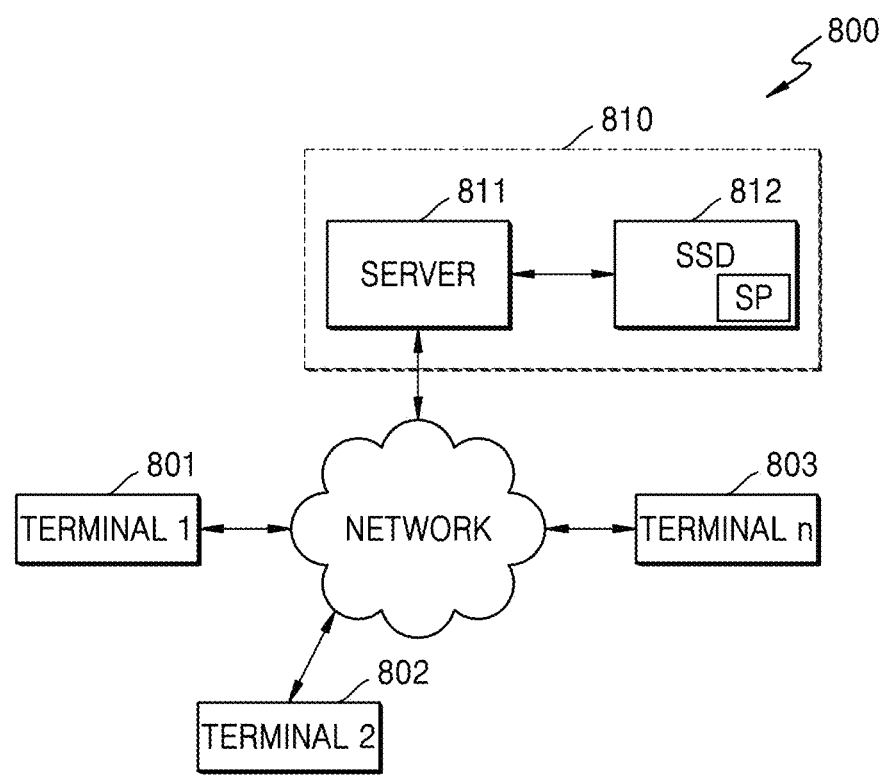
FIG. 15 is a block diagram of a network system including a data server, according to at least one example embodiment.

FIG. 15 is a block diagram of a network system including a data server, according to at least one example embodiment. A plurality of terminals (e.g., computing nodes) are shown in FIG. 15 together with the data server, which may include a storage system according to some example embodiments, but the example embodiments are not limited thereto.

Referring to FIG. 15, a network system 800 may include a data server 810 and a plurality of terminals, e.g., terminals 801, 802, and 803, etc., which communicate with one another through a network, however the example embodiments are not limited thereto and there may be any number of terminals, etc. The data server 810 may include a server 811 functioning as the host and at least one SSD 812 as a storage device.

The server 811 may process requests received from the terminals 801 through 803 connected to the network. For example, the server 811 may store data from one or more of the plurality of terminals 801 through 803 in the SSD 812. The data from the terminals 801 through 803 may be encrypted and then stored in the SSD 812. The data stored in the SSD 812 may be decrypted and then provided to one or more of the plurality of terminals 801 through 803, etc. According to at least one example embodiment, the safety pin SP may be mounted on the SSD 812. When one of the terminals 801 through 803 requests to discard the SSD 812, the safety pin SP may be removed from the SSD 812.

Figure 16:
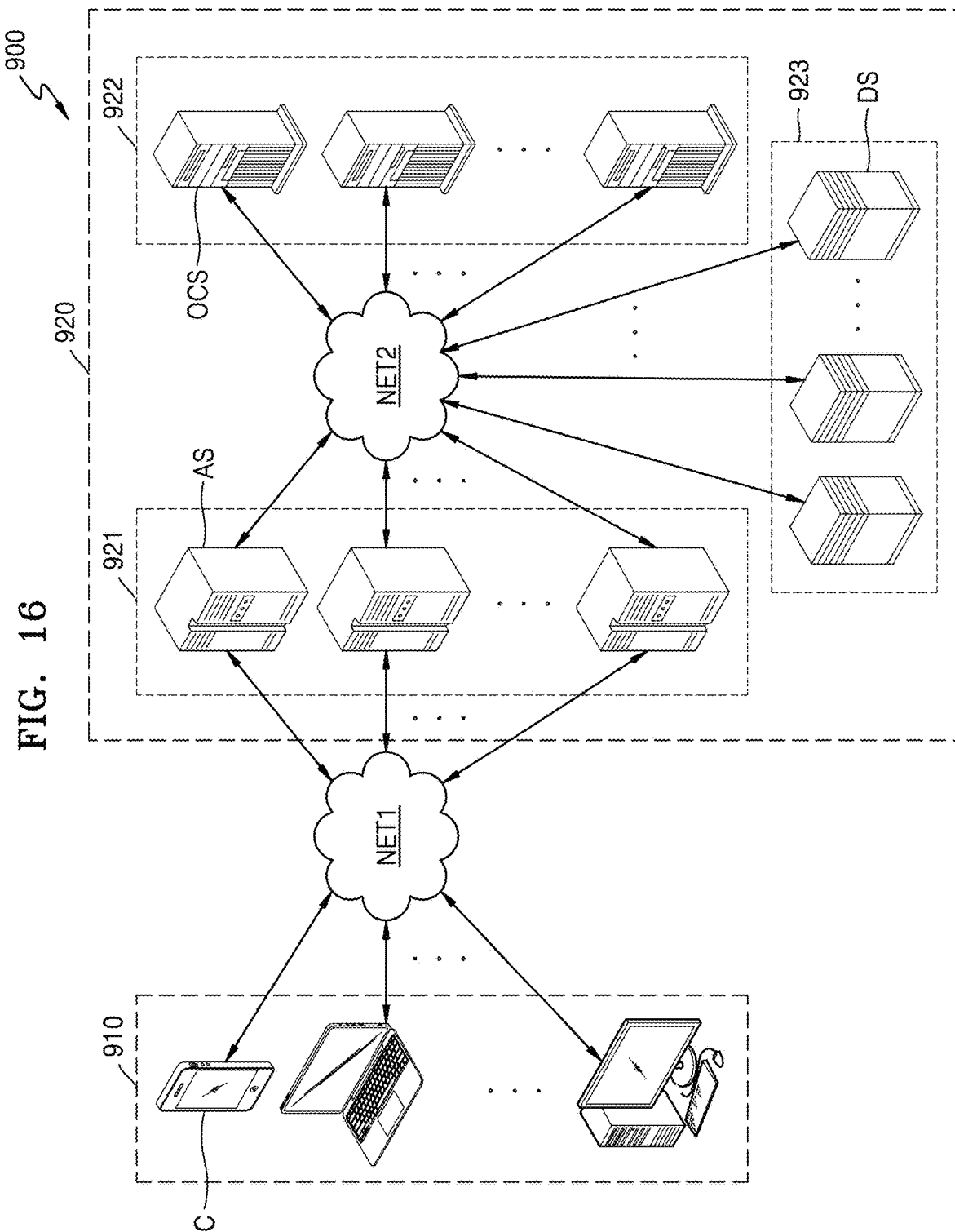
FIG. 16 is a block diagram of a network system according to at least one example embodiment.

FIG. 16 is a block diagram of a network system 900 according to at least one example embodiment.

Referring to FIG. 16, the network system 900 may include a client group 910 and a data center 920. The client group 910 may include client devices C, which communicate with the data center 920 through at least one first network NET1, e.g., the Internet, a cloud network, an intranet, a local area network, etc., but the example embodiments are not limited thereto. The data center 920 may save various data and provide services and may include an application server group 921, a database server group 923, and/or an object cache server group 922, etc., which communicate with one another through at least one second network NET2, e.g., a local area network (LAN), an intranet, etc.

The application server group 921 may include one or more application server devices AS, but is not limited thereto. The application server devices AS may process requests received from the client group 910 and may access the database server group 923 and/or the object cache server group 922 at the request of the client group 910, etc. The database server group 923 may include one or more database server devices DS storing data processed by the application server devices AS. The object cache server group 922 may include one or more object cache server devices OCS, which temporarily store (e.g., buffer and/or cache) data to be stored in the database server devices DS and/or data read from the database server devices DS, and thus function as a cache between the application server devices AS and the database server devices DS.

According to some example embodiments, a storage device and a storage system may be included in the network system 900 in various forms. For example, the storage device according to some example embodiments may be used to store data in the database server group 923, but the example embodiments are not limited thereto. Accordingly, a plurality of storage devices (e.g., SSDs or HDDs) may be included in the database server group 923 in FIG. 16, and the safety pin according to some example embodiments may be mounted on each of the storage devices, etc.

While various example embodiments of the inventive concepts have been particularly shown and described with reference to example embodiments thereof, it will be understood that various changes in form and details may be made therein without departing from the spirit and scope of the following claims.

What is claimed is:

1. A storage device storing data, the storage device comprising:
   a safety pin device removably mounted on the storage device, the safety pin device configured to store first encrypted information and second encrypted information, the first encrypted information encrypted using a first key associated with a first user, and the second encrypted information encrypted using a second key associated with a second user;
   security circuitry configured to,
     receive the first encrypted information from the safety pin device,
     decrypt the first encrypted information, and
     generate a data encryption key based on results of the decrypting the first encrypted information; and
   a nonvolatile memory configured to store data encrypted with the data encryption key, wherein
   the first encrypted information is generated by encrypting first unique information associated with the storage device and second unique information associated with the second user using the first key,
   the second encrypted information is generated by encrypting the first unique information and the second unique information using the second key, and
   the second encrypted information is used to determine whether the storage device has been properly discarded.

2. The storage device of claim 1, wherein the storage device includes at least a solid state drive.

3. The storage device of claim 1, wherein the second encrypted information is generated by the second user and stored in the safety pin device.

4. The storage device of claim 1, wherein the first unique information includes a unique identifier corresponding to the storage device, and the second unique information includes a personal identification number associated with the second user.

5. The storage device of claim 1, wherein the security circuitry is further configured to:
store the first key and a unique identifier corresponding to the storage device;
perform the decrypting of the first encrypted information using the first key;
extract the first unique information from the decrypted first encrypted information; and
authenticate the safety pin device based on the unique identifier corresponding to the storage device and the extracted first unique information.

6. The storage device of claim 5, wherein
the security circuitry and the safety pin device are each further configured to connect to safety pin creation circuitry; and
the safety pin creation circuitry is caused to,
perform a setting operation on the safety pin device,
receive the unique identifier corresponding to the storage device stored in the security circuitry,
generate the first encrypted information and the second encryption information using the unique identifier corresponding to the storage device as the first unique information, and
transmit the generated first encrypted information and the generated second encrypted information to the safety pin device.

7. The storage device of claim 1, wherein
the safety pin device includes an interface circuit configured to communicate with a safety pin tester device; and
the safety pin device is further configured to transmit the second encrypted information to the safety pin tester device through the interface circuit in a state where the safety pin device has been removed from the storage device.

8. The storage device of claim 7, wherein the second encrypted information is generated by encrypting information identical to unique information corresponding to the second user stored in the safety pin tester device.

9. The storage device of claim 1, further comprising:
a storage circuit configured to store third encrypted information generated by encrypting the data encryption key with a third key; and
wherein the security circuitry is further configured to,
derive the third key using, as an input, information extracted from the first encrypted information, and
generate the data encryption key by decrypting the third encrypted information using the third key.

10. The storage device of claim 9, wherein the security circuitry is further configured to encrypt and/or decrypt the second user's data using the data encryption key.

11. A safety pin device removably mounted on at least one storage device configured to store data, the safety pin device comprising:
at least one storage circuit configured to store first encrypted information and second encrypted information, the first encrypted information encrypted using a first key, and the second encrypted information encrypted using a second key; and
a first interface circuit configured to output the second encrypted information to allow a second user to determine whether the storage device has been properly discarded after the safety pin device is removed from the storage device, wherein
the first encrypted information is generated by encrypting first unique information associated with the at least one storage device and second unique information associated with the second user using the first key,
the second encrypted information is generated by encrypting the first unique information and the second unique information using the second key, and
the second encrypted information is used to determine whether the storage device has been properly discarded.

12. The safety pin device of claim 11, wherein
the first interface circuit is further configured to connect to a second user safety pin tester device associated with the second user; and
the second user safety pin tester device is configured to store the second key, and
receive the second encrypted information.

13. The safety pin device of claim 11, wherein
the first interface circuit is further configured to connect to a first user safety pin tester device associated with a first user; and
the first user safety pin tester device is configured to store the first key, and
receive the first encrypted information to allow the first user to determine whether the storage device has been properly discarded.

14. The safety pin device of claim 11, wherein
the first unique information associated with the at least one storage device is a unique identifier associated with the at least one storage device, and
the second unique information associated with the second user is a personal identification number associated with the second user.

15. The safety pin device of claim 14, wherein the second encrypted information is generated by encrypting the unique identifier associated with the at least one storage device and the personal identification number using the second key.

16. The safety pin device of claim 15, wherein the safety pin device is further configured to:
connect to safety pin creation circuitry external to the safety pin device; and
receive the first encrypted information from the safety pin creation circuitry.

17. The safety pin device of claim 15, wherein the safety pin device is further configured to:
connect to safety pin creation circuitry external to the safety pin device; and
receive the second encrypted information through the safety pin creation circuitry.

18. The safety pin device of claim 11, further comprising:
at least one second interface circuit configured to,
communicate with security circuitry included in the storage device; and
provide the first encrypted information to the security circuitry to enable the storage device to generate a data encryption key used for data encryption and/or decryption.

* * * * *